United States Patent
Cho

(10) Patent No.: US 10,338,774 B2
(45) Date of Patent: Jul. 2, 2019

(54) MOBILE TERMINAL AND METHOD FOR CONTROLLING THE SAME

(71) Applicant: LG ELECTRONICS INC., Seoul (KR)

(72) Inventor: Taehoon Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 555 days.

(21) Appl. No.: 15/063,110

(22) Filed: Mar. 7, 2016

(65) Prior Publication Data
US 2016/0378277 A1 Dec. 29, 2016

(30) Foreign Application Priority Data

Jun. 26, 2015 (KR) .................. 10-2015-0091142

(51) Int. Cl.
| | |
|---|---|
| *G06F 3/0482* | (2013.01) |
| *H04M 1/725* | (2006.01) |
| *G06F 3/0481* | (2013.01) |
| *G06F 3/0484* | (2013.01) |
| *G06F 3/0488* | (2013.01) |
| *H04M 1/247* | (2006.01) |

(52) U.S. Cl.
CPC ........ *G06F 3/0482* (2013.01); *G06F 3/04817* (2013.01); *G06F 3/04842* (2013.01); *G06F 3/04883* (2013.01); *G06F 3/04886* (2013.01); *H04M 1/2477* (2013.01); *H04M 1/7253* (2013.01); *H04M 1/72583* (2013.01); *H04M 2250/22* (2013.01); *H04M 2250/64* (2013.01)

(58) Field of Classification Search
None
See application file for complete search history.

(56) References Cited

U.S. PATENT DOCUMENTS

| | | | | |
|---|---|---|---|---|
| 2009/0116815 A1* | 5/2009 | Ryu | ............... | H04N 5/76 386/241 |
| 2009/0185033 A1* | 7/2009 | Nozaki | ............. | H04N 5/23219 348/77 |
| 2013/0238724 A1* | 9/2013 | Cunningham | .......... | H04L 51/24 709/206 |
| 2014/0365919 A1* | 12/2014 | Shaw | ................. | H04L 12/1822 715/753 |
| 2015/0074106 A1* | 3/2015 | Ji | ..................... | G06F 17/30595 707/736 |
| 2015/0113432 A1* | 4/2015 | Jung | .................... | H04L 67/10 715/748 |

(Continued)

FOREIGN PATENT DOCUMENTS

| | | |
|---|---|---|
| EP | 1363442 A1 | 11/2003 |
| EP | 2701047 A1 | 2/2014 |

*Primary Examiner* — Tuan S Nguyen
(74) *Attorney, Agent, or Firm* — Birch, Stewart, Kolasch & Birch, LLP

(57) ABSTRACT

A mobile terminal, including a wireless communication processor; a touch screen; and a controller configured to: execute a first function specifying a counterpart, and execute a second function in combination with a display of a first menu for transmitting at least one or more contents selected by the second function to the specified counterpart through the wireless communication processor, in response to an execution command for executing the second function within a prescribed time from a timing of executing, suspending or ending the first function.

12 Claims, 24 Drawing Sheets

(56) References Cited

U.S. PATENT DOCUMENTS

2015/0160802 A1\* 6/2015 Lopez .................... G06F 3/048
                                                     715/810
2015/0227287 A1\* 8/2015 Lee ..................... G06F 3/04883
                                                     715/830
2016/0371683 A1\* 12/2016 Maus ................. G06Q 20/3829

\* cited by examiner

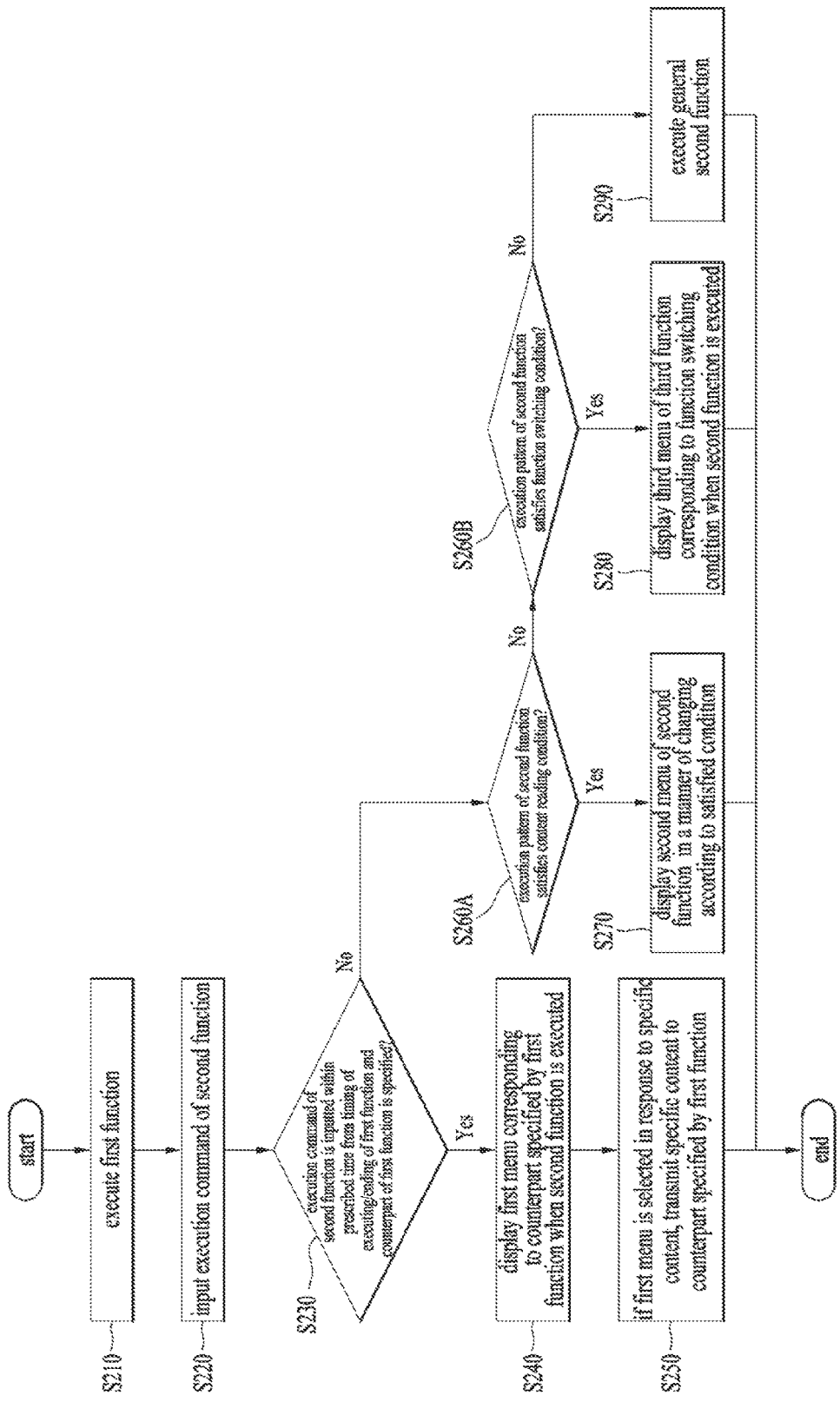

FIG. 9
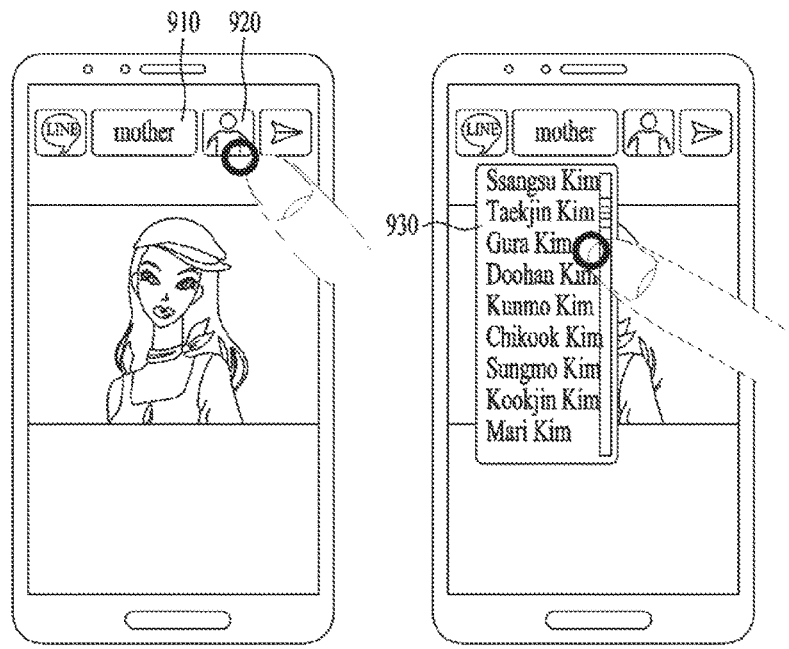
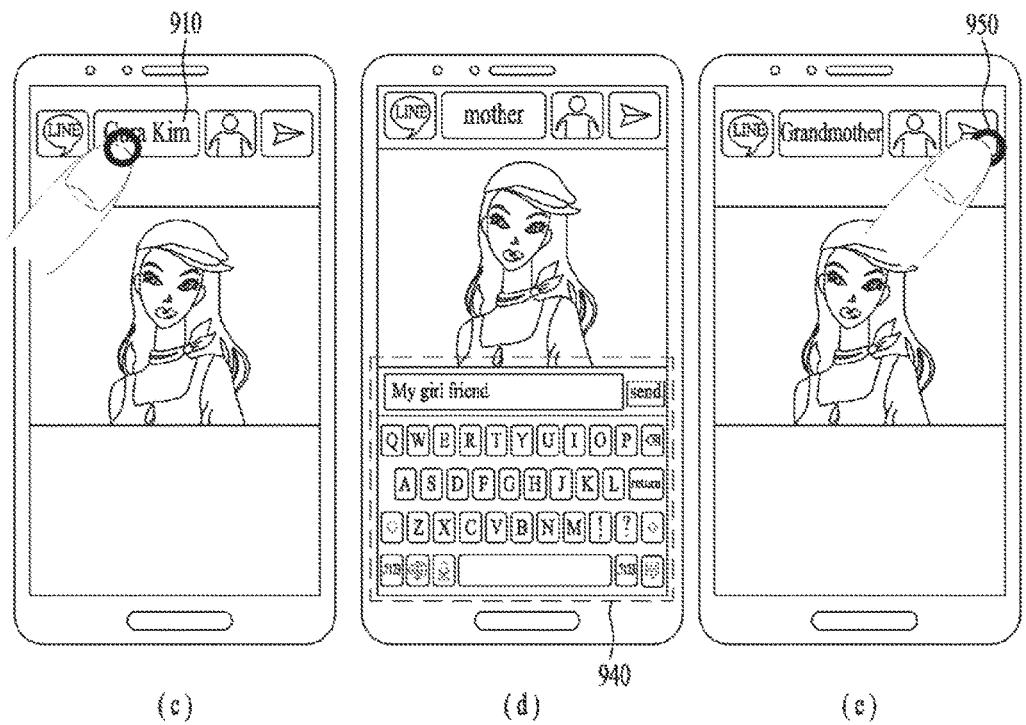

FIG. 10
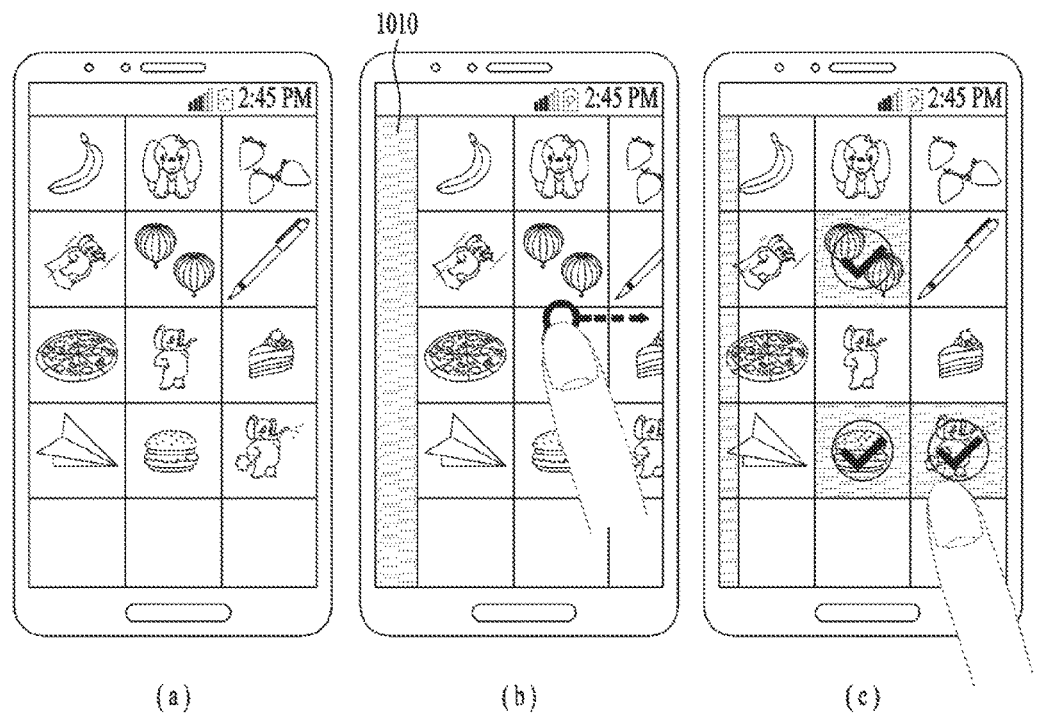
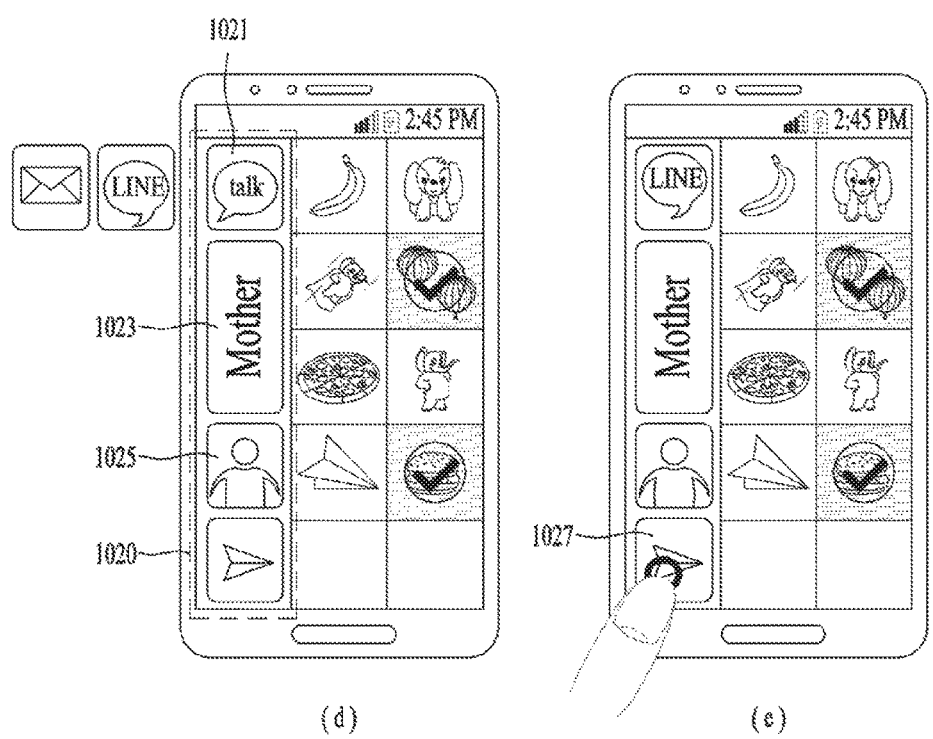

(a)          (b)

FIG. 17
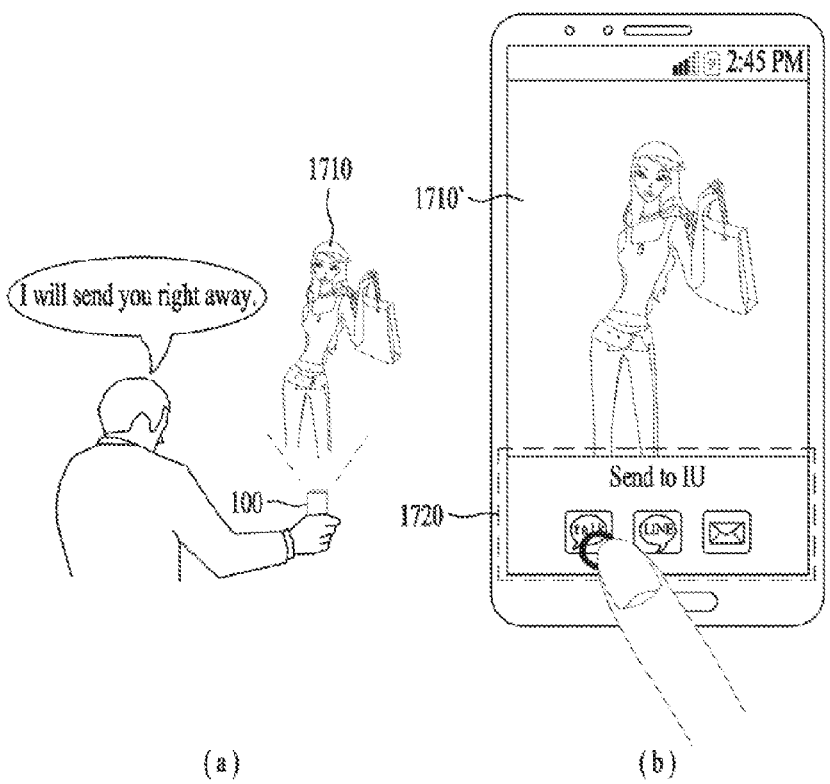
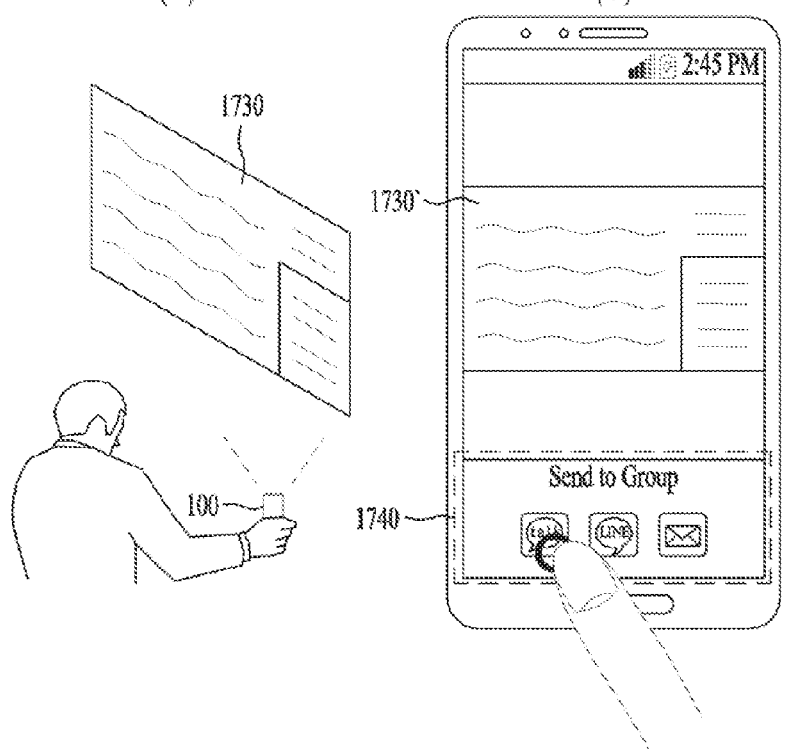

FIG. 18
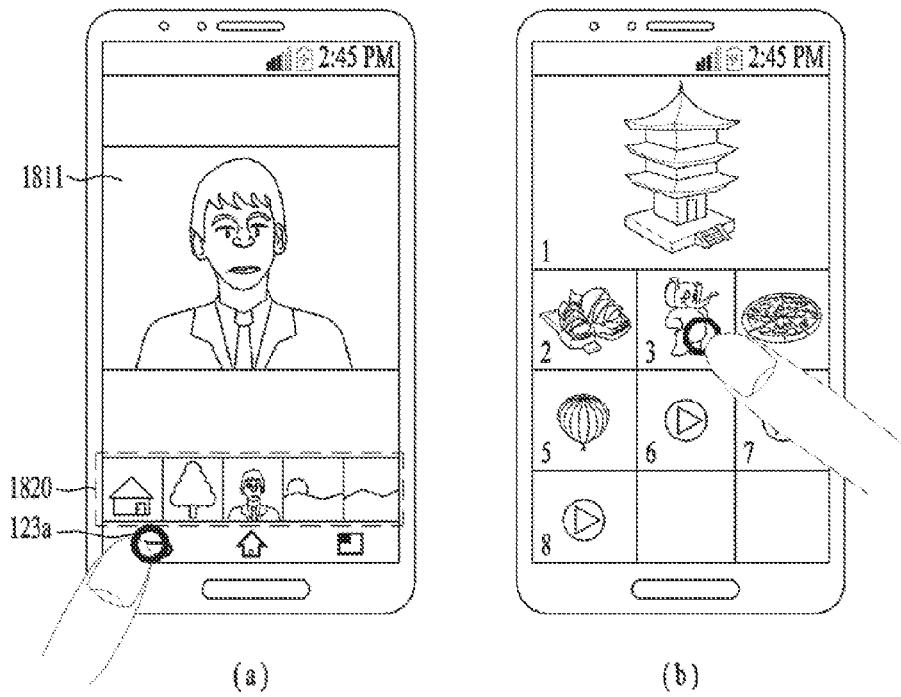
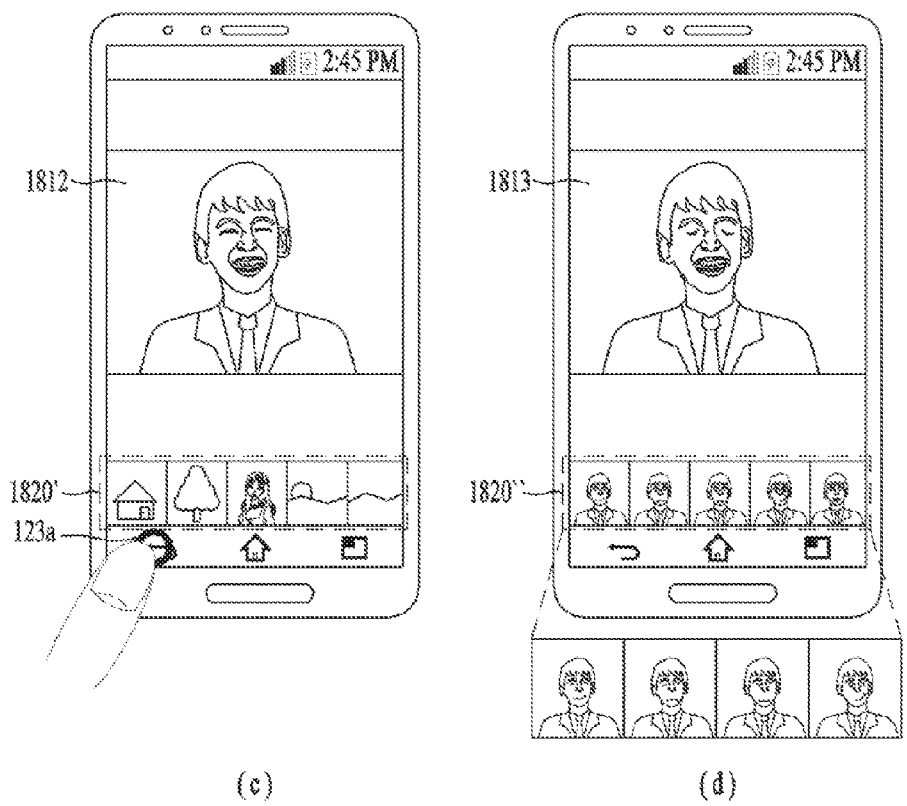

MOBILE TERMINAL AND METHOD FOR CONTROLLING THE SAME

Pursuant to 35 U.S.C. § 119(a), this application claims the benefit of earlier filing date and right of priority to Korean Application No. 10-2015-0091142, filed on Jun. 26, 2015, the contents of which are hereby incorporated by reference herein in its entirety.

BACKGROUND OF THE INVENTION

Field of the Invention

The present invention relates to a mobile terminal providing various convenient functions according to whether or not a predetermined condition is satisfied and a method of controlling therefor.

Discussion of the Related Art

Terminals may be generally classified as mobile/portable terminals or stationary terminals. Mobile terminals may also be classified as handheld terminals or vehicle mounted terminals. A function of a mobile terminal is diversifying. For instance, the function of the mobile terminal may include data and audio communication, picture and video capturing via a camera, voice recording, playing a music file via a speaker system and outputting an image or a video on a display unit. Some terminals perform a function of an electronic game or a function of a multimedia player. In particular, a latest mobile terminal can receive a multicast signal providing visual contents such as a broadcast, a video and a television program. As a function of a terminal is diversified, the terminal is implemented in a multimedia player form equipped with complex functions including capturing a picture or a video, playing music or a video file, gaming, receiving a broadcast and the like for example.

Recently, sequentially or alternately using a plurality of functions of a mobile terminal used by a user is becoming frequent. Yet, the mobile terminal simply switches between functions only via multitasking and information on a previously used function is not sufficiently considered in relation to an intention of the user in a currently executed function.

SUMMARY OF THE INVENTION

Accordingly, embodiments of the present invention are directed to a mobile terminal and controlling method thereof that substantially obviate one or more problems due to limitations and disadvantages of the related art.

An object of the present invention is to provide a mobile terminal enhancing user convenience and a method of controlling therefor.

In particular, when executing a specific function, the object of the present invention is to provide a mobile terminal capable of providing a convenient function in consideration of a previously executed different function and a method of controlling therefor.

When executing a specific function, another object of the present invention is to provide a mobile terminal capable of providing a convenient function according to a previous use pattern of the specific function and a method of controlling therefor.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a mobile terminal can include a wireless communication unit, a touch screen and a controller, the controller configured to execute a first function specifying a counterpart, the controller, if an execution command of a second function enabling contents to be displayed on the touch screen within prescribed time from timing of executing, suspending or ending the first function is input, configured to make a first menu for transmitting at least one or more contents selected by the second function to the specified counterpart through the wireless communication unit to be displayed on the touch screen.

To further achieve these objects and other advantages and in accordance with the purpose of the invention, as embodied and broadly described herein, according to a different embodiment, a method of controlling a mobile terminal can include the steps of executing a first function specifying a counterpart, inputting an execution command of a second function enabling contents to be displayed on a touch screen within prescribed time from timing of executing, suspending or ending the first function and displaying a first menu for transmitting at least one or more contents selected by the second function to the specified counterpart on the touch screen.

Effects obtainable from the present invention may be non-limited by the above mentioned effect. And, other unmentioned effects can be clearly understood from the following description by those having ordinary skill in the technical field to which the present invention pertains. It is to be understood that both the foregoing general description and the following detailed description of the present invention are exemplary and explanatory and are intended to provide further explanation of the invention as claimed.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 2 is a flowchart illustrating a process for providing a convenient function according to a previously executed function or a user pattern in a mobile terminal according to one embodiment of the present invention;

FIG. 9 is a diagram illustrating a process for calling up a transmission menu and changing a recipient in a mobile terminal according to one embodiment of the present invention;

FIG. 10 is a diagram illustrating a process for calling up a transmission menu in a mobile terminal according to another embodiment of the present invention;

FIG. 17 is a diagram illustrating a process for calling up a transmission menu via various applications in a mobile terminal according to another embodiment of the present invention;

FIG. 18 is a diagram illustrating changing a second menu of a second function in a mobile terminal according to one embodiment of the present invention;

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
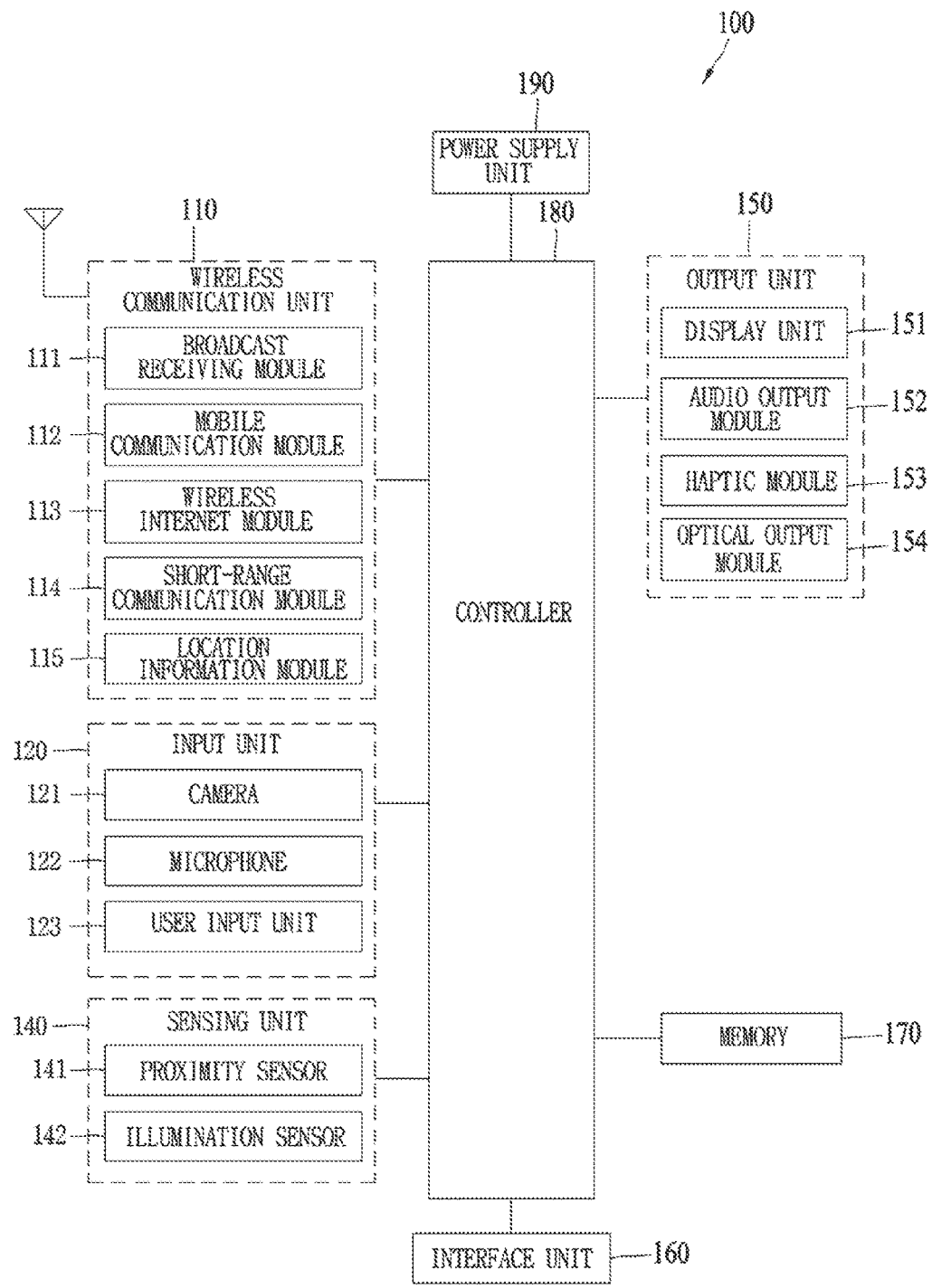
FIG. 1A is a block diagram of a mobile terminal according to an embodiment of the present disclosure.
Figure 1B:
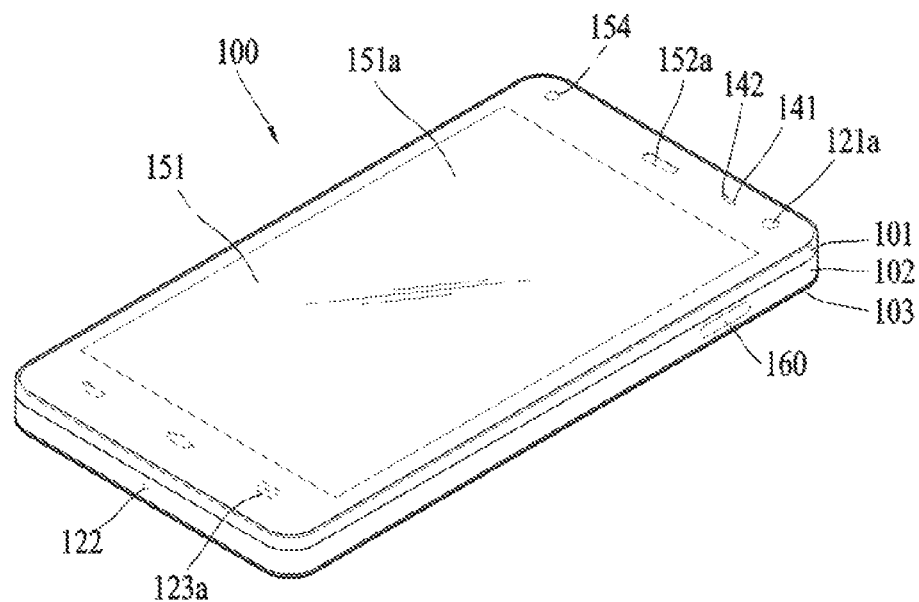
FIGS. 1B and 1C are conceptual views of one example of the mobile terminal, viewed from different directions.
Figure 1C:
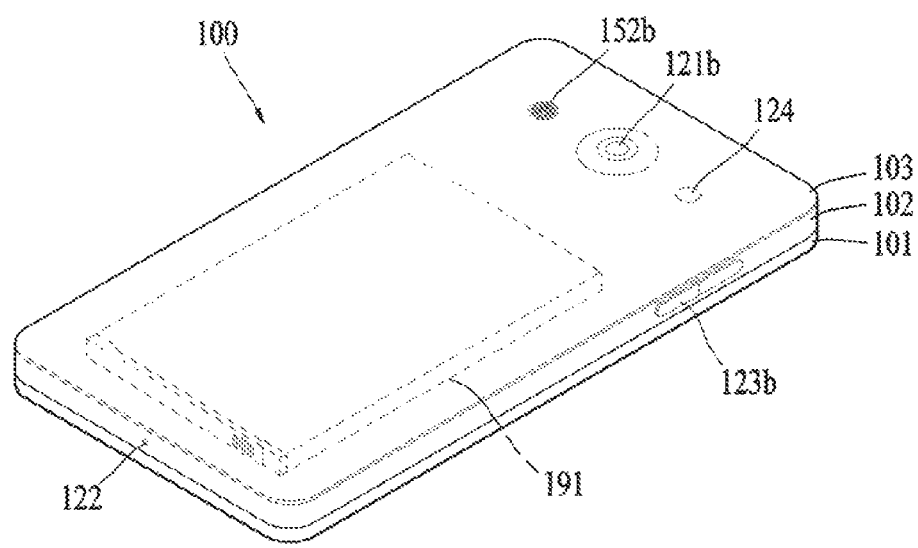

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions. The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information. In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a. The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen. As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Provision of Convenient Function in Accordance with User Intention

As mentioned in the foregoing description, as more various functions are performed via a mobile terminal, sequentially or alternately using a plurality of functions of the mobile terminal used by a user is becoming frequent. However, a related art mobile terminal simply switches between functions via multitasking or sequential function execution only. In addition, information on a previously used function is not sufficiently considered in relation to an intention of the user in a currently executed function.

Hence, when a specific function is executed by a user, one embodiment of the present invention provides a convenient function in accordance with an intention of the user in consideration of information on a previously executed function. When one function is executed (or terminated/ended) and then another function is immediately executed within a prescribed time, there is a high possibility the lately executed function is related to the previously executed function.

In this instance, the previously executed function may correspond to a function identical to a function for which a user currently intends to use or a function different from the function for which the user currently intends to use. In this instance, a function may correspond to a single application or a different menu/page provided by an identical application. Depending on an operating system (OS) of a mobile terminal, a function may correspond to unit software which is called such a different name as a program, an application program and the like instead of an application. Of course, this is just an example. It is apparent to those skilled in the art that a function described in the present invention can be configured by a larger unit (e.g., a plurality of application groups) or a smaller unit (e.g., one submenu deployed within a specific page in one application).

As an example to which the present embodiment is applied, when a user executes a gallery application right after a phone call is ended, it can be strongly considered as the user intends to transmit a specific image to a counterpart of the phone call. Hence, when the gallery application is executed, if a menu capable of transmitting an image to the counterpart is provided through the gallery application, the user can conveniently transmit an image to the counterpart by selecting the image and just selecting the provided menu. In particular, if a medium to be used for transmitting an image, i.e., an application, is specified on the menu together with a recipient of the image, it is far more convenient compared to a general transmission process including 1) selecting an image by a user, 2) selecting an application used for transmitting the image, 3) selecting a recipient of the image in the selected application, and 4) inputting a final transmission command.

In the following, a process of providing a convenient function according to one embodiment of the present invention is explained with reference to FIG. 2. In particular, FIG. 2 is a flowchart illustrating a process for providing a convenient function according to a previously executed function or a user pattern in a mobile terminal according to one embodiment of the present invention.

Referring to FIG. 2, a first function is executed in the mobile terminal (S210). Subsequently, an execution command for a second function is input (S220). In this instance, the second function may correspond to a function identical or different to/from the first function. In addition, the first function may already be in an finished or ended state or a suspended state (e.g., operating as background) when the execution command for the second function is input.

Further, the execution command for the second function can be input (e.g., touching an icon corresponding to the second function) by a user via the touch screen 151 or the user input unit 123 or the controller 180 can automatically trigger the execution command for the second function when a predetermined execution condition of the second function is satisfied (e.g., occurrence of a specific event such as arrival of predetermined timing, receiving a predetermined radio signal from external etc.).

If the execution command for the second function is input/occurs within prescribed time from timing of executing or ending the first function and a counterpart is specified by the first function (Yes in S230), the controller 180 can display a first menu corresponding to the counterpart specified by the first function on the touch screen 151 when the second function is executed (S240). In this instance, specifying the counterpart by the first function indicates that the first function is performed for the specified counterpart. For instance, for a telephone call application, a person to whom a user makes a phone call or a person from whom the user receives a phone call is specified as a counterpart. For an e-mail/message application, a recipient of a lastly sent mail/message or a sender of a received mail/message can be specified as a counterpart. Also, the first menu can be automatically displayed when the second function is executed or can be displayed when a user inputs a command of a specific form.

If the first menu is selected in response to specific contents displayed through the second function, the controller 180 can transmit the contents to a counterpart specified by the first function. If at least one condition among the two conditions is not satisfied (i.e., if a counterpart is not specified by the first function or the execution command for the second function occurs after a prescribed time elapses from the timing of executing/ending the first function) (No in S230), the controller 180 can determine whether a previous execution pattern of the second function satisfies a content reading condition (S260A).

In this instance, satisfying the content reading condition indicates that there exists a constant pattern as a result of analyzing a pattern of a user reading contents when executing the second function. For instance, when reading images, if a user watches a plurality of pictures in which a specific person is included in a full-view (or image full-view) from a thumbnail view, if the user zooms-in images in which a plurality of persons are included to closely watch a specific person, or if the user selectively plays music of a specific singer, the controller 180 can determine this as the content reading condition is satisfied.

In addition, the full-view corresponds to a whole of an image being displayed on a single screen and one of landscape orientation and portrait orientation of the image is adjusted to be fully fit to the screen. In general, if a thumbnail is selected from a thumbnail view state in which thumbnails respectively corresponding to each image are displayed in a gallery application, an image corresponding to the selected thumbnail is displayed in the full-view.

If the content reading condition is satisfied (Yes in S260A), the controller 180 can display a second menu of the second function by changing the second menu in response to the satisfied condition when the second function is executed (S270). A form of changing the second menu will be described in more detail later with reference to FIG. 18 and FIG. 19.

In addition, the controller 180 can determine whether an execution pattern of the second function satisfies a function switching condition instead of the content reading condition (S260B). In this instance, satisfying the function switching condition indicates the count of reactivating the second function from a different function being greater than a prescribed count when the second function is previously executed. For instance, when a navigation application is operating, if a user enters a home screen by pushing a home key button, executes a music playback application and then calls up the navigation application, which is operating as background, again to the foreground, these operations correspond to a condition satisfying the function switching condition.

If the function switching condition is satisfied (Yes in S260B), the controller 180 can display a third menu for a third function corresponding to the function switching condition, which is satisfied when the second function is executed (S280). The third menu can perform a shortcut function for calling up the third function or specific contents displayed via the third function to foreground execution or a function of displaying an execution screen of the third function or specific contents displayed through the execution screen of the third function on a prescribed region while the second function is executed. A specific form and function of the third menu will be described later with reference to FIG. 21 to FIG. 23.

If it is determined that no condition is satisfied among the aforementioned conditions (No in S260B), the controller 180 can executes the second function in a general form without changing any menu among the first menu to the third menu (S290). In the following, the first menu, which is provided when the condition mentioned earlier in the step S230 is satisfied, is explained in more detail with reference to FIG. 3 to FIG. 16.

As mentioned in the foregoing description, when a user immediately enters a gallery after such a function of specifying a counterpart as telephone call, message transmission/reception etc. is used, an intention of the user is most likely to transmit an image to the specified counterpart. In this instance, an example of displaying a menu capable of conveniently transmitting an image to a counterpart is shown in FIG. 3.

Figure 3:
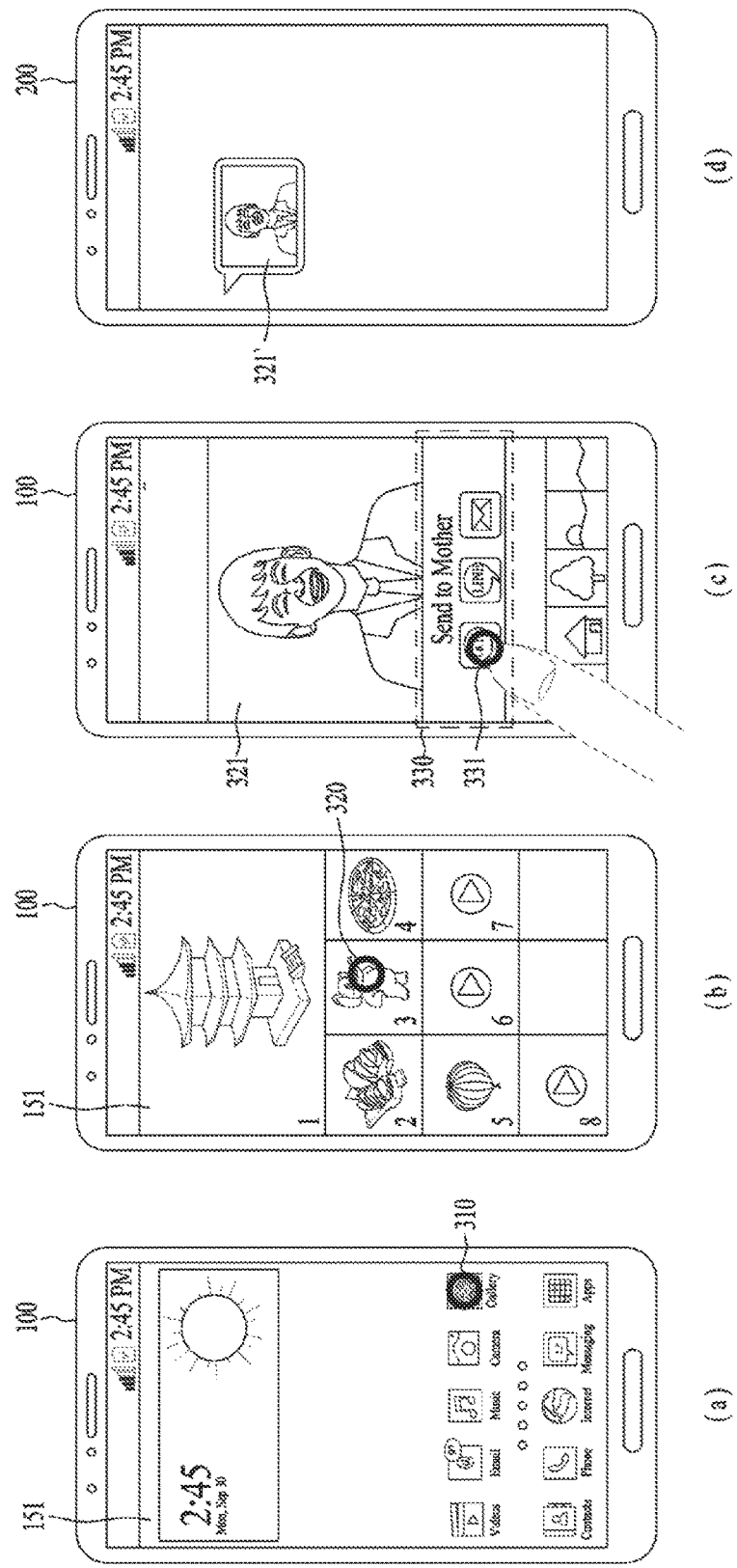
FIG. 3 is a diagram illustrating a process for providing a convenient function to transmit an image via a gallery application in a mobile terminal according to one embodiment of the present invention.

In particular, FIG. 3 is a diagram illustrating a process of providing a convenient function to transmit an image via a gallery application in a mobile terminal according to one embodiment of the present invention. In FIG. 3, assume a situation that the user just hung up the phone after talking with their mother and the user intends to transmit an image to the mother.

Referring to FIG. 3 (*a*), a home screen is displayed on a touch screen 151 of the mobile terminal 100. In this instance, if the user touches an icon 310 corresponding to a gallery application, as shown in FIG. 3 (*b*), an execution screen of the gallery application is displayed on the touch screen 151 and a plurality of folders are displayed on the screen. If the user selects a folder 320 in which an image preferred to be transmitted is included from a plurality of the folders and selects the image from the folder, as shown in FIG. 3 (*c*), the image 321 can be displayed in a full-view form.

In this instance, if execution of the gallery application, i.e., selection of the icon 310 is performed within a predetermined time after the telephone call is ended, the controller 180 can automatically display a transmission menu 330, which is configured to immediately transmit the image to the mother corresponding to the last telephone call counterpart, on a region of the touch screen. In this instance, the mother corresponding to the last telephone call counterpart is automatically designated as a recipient of the image and the recipient is displayed on the transmission menu 330.

Icons corresponding to applications capable of transmitting the image can be displayed on the transmission menu 330. In this instance, the applications capable of transmitting the image can obtain such contact information of a counterpart as a telephone number, e-mail account, a messenger account and the like for identifying the counterpart by sharing a contact list.

If the user selects one icon 331 among the icons corresponding to the applications capable of transmitting the image from the transmission menu 330, a currently displayed image 321 can be transmitted via the selected application. Hence, as shown in FIG. 3 (*d*), a transmitted image 321' can be displayed on a mobile terminal 200 of the counterpart. In addition, the aforementioned image transmission process can be sequentially performed for a plurality of images, which This will be explained with reference to FIG. 4.

Figure 4:
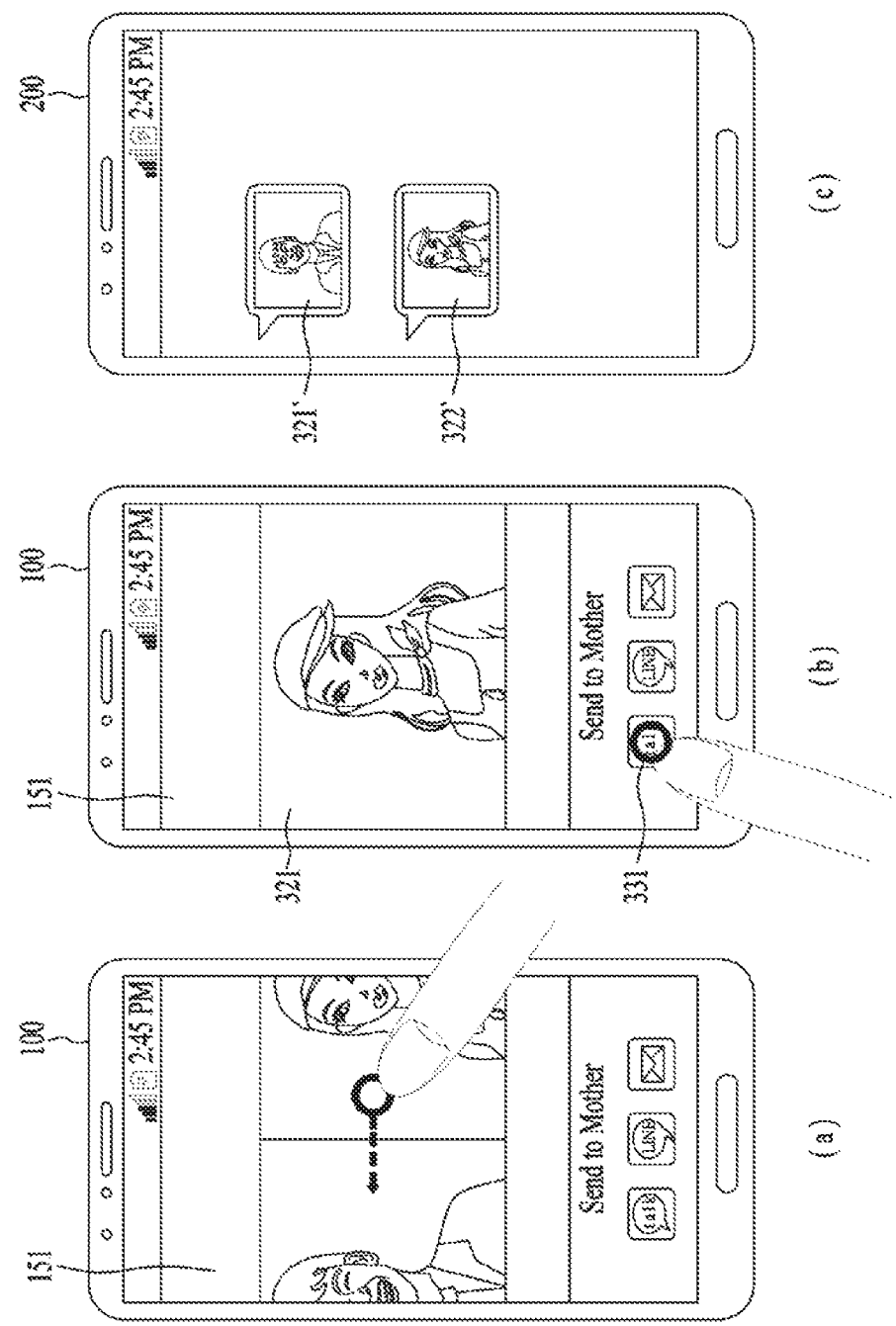
FIG. 4 is a diagram illustrating a process for sequentially transmitting a plurality of images via a menu configured to transmit an image provided in a mobile terminal according to one embodiment of the present invention.

In particular, FIG. 4 is a diagram illustrating a process for sequentially transmitting a plurality of images via a menu configured to transmit an image provided in a mobile terminal according to one embodiment of the present invention. Assume that a process of FIG. 4 corresponds to a process followed by a process of FIG. 3.

Referring to FIG. 4 (*a*), after a picture 321 is transmitted using the transmission menu 330, the user can search for a different image through a flicking touch input in horizontal direction. As a result of the search, as shown in FIG. 4 (*b*), when an image 322 preferred to be transmitted to an identical counterpart is displayed, the user can select an icon 331 of an application corresponding to a preferred transmission medium again through a touch input. By doing so, the searched different image 322 is transmitted to a last telephone call counterpart via the selected application. As shown in FIG. 4 (*c*), an additionally transmitted image 322' can be displayed on the mobile terminal 200 of the counterpart.

Figure 5:
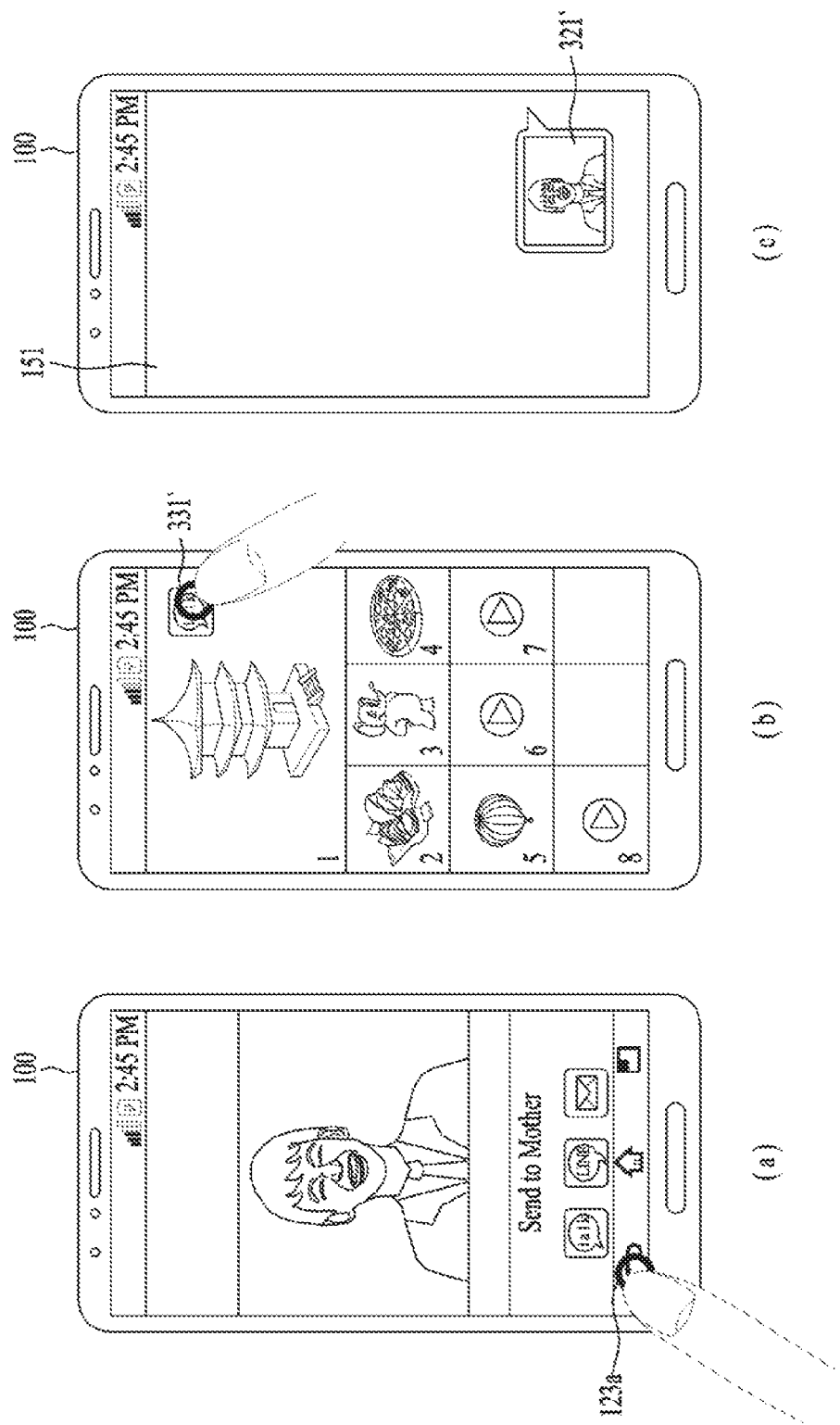
FIG. 5 is a diagram illustrating a process for checking a transmitted image in a mobile terminal according to one embodiment of the present invention.

Next, FIG. 5 is a diagram illustrating a process for checking a transmitted image in a mobile terminal according to one embodiment of the present invention. Assume that a process of FIG. 5 corresponds to a process followed by a process of FIG. 3.

Referring to FIG. 5 (*a*), after the image preferred to be transmitted is transmitted to the last telephone call counterpart via the transmission menu, as shown in FIG. 5 (*b*), the user can enter a folder view by operating a back key button 123*a*. In the folder view, an icon 331' of the application, which has been selected to transmit the image preferred to be transmitted, can be displayed.

In this instance, as shown in FIG. 5 (*c*), if the user touches the icon 331', the application corresponding to the icon 331' is executed and information 321" on the image transmitted to the last telephone call counterpart can be displayed. Through the aforementioned process, the user can conveniently check a history transmitted to the last telephone call counterpart. Of course, the icon can also be displayed via the process mentioned earlier in FIG. 3 in a state of not transmitting an image.

Figure 6:
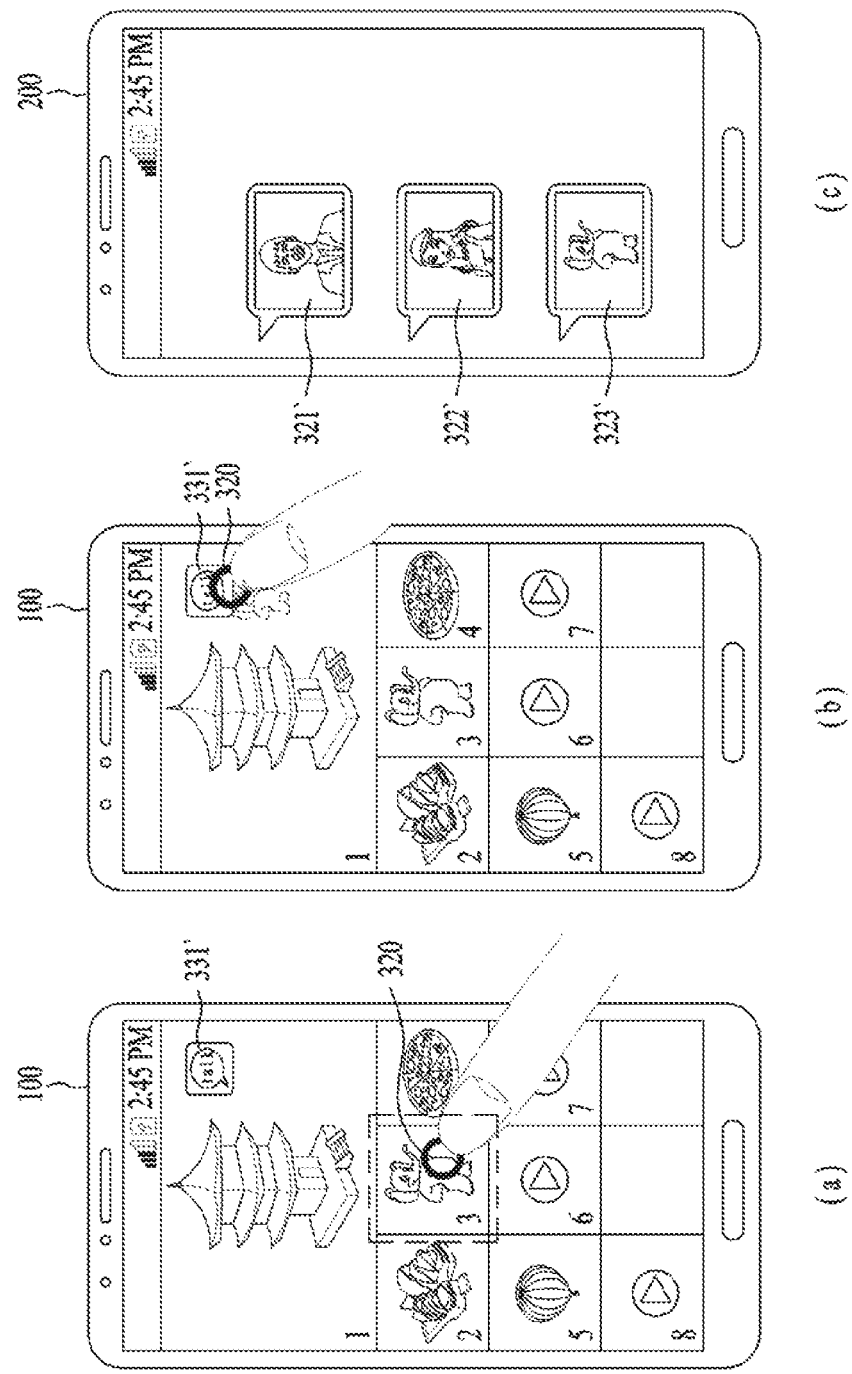
FIG. 6 is a diagram illustrating a process for transmitting an image folder in a mobile terminal according to one embodiment of the present invention.

In addition, an icon displayed in a folder view state can also be used for transmitting a folder itself to a predetermined counterpart. Regarding his, it is explained with reference to FIG. 6 in the following. In particular, FIG. 6 is a diagram illustrating a process for transmitting an image folder in a mobile terminal according to one embodiment of the present invention. Assume that a process of FIG. 6 corresponds to a process followed by a process of FIG. 5 (*a*).

Referring to FIG. 6 (*a*), a user touches a folder 320 preferred to be transmitted in the folder view state and can then drag and drop the folder on an icon 331' corresponding to an application to be used for transmitting the folder as shown in FIG. 6 (*b*). Further, pictures included in the folder 320 are transmitted to a predetermined counterpart. As shown in FIG. 6 (*c*), transmitted images 321'/322'/323' can be displayed on a mobile terminal 200 of the predetermined counterpart. Through the aforementioned process, the user can conveniently transmit all images included in a folder to the predetermined counterpart.

Although the transmission menu mentioned above is explained as being displayed when entering the gallery application within a prescribed time after a phone call is ended, a function similar to the transmission menu can also be provided while a user is on the phone.

Figure 7:
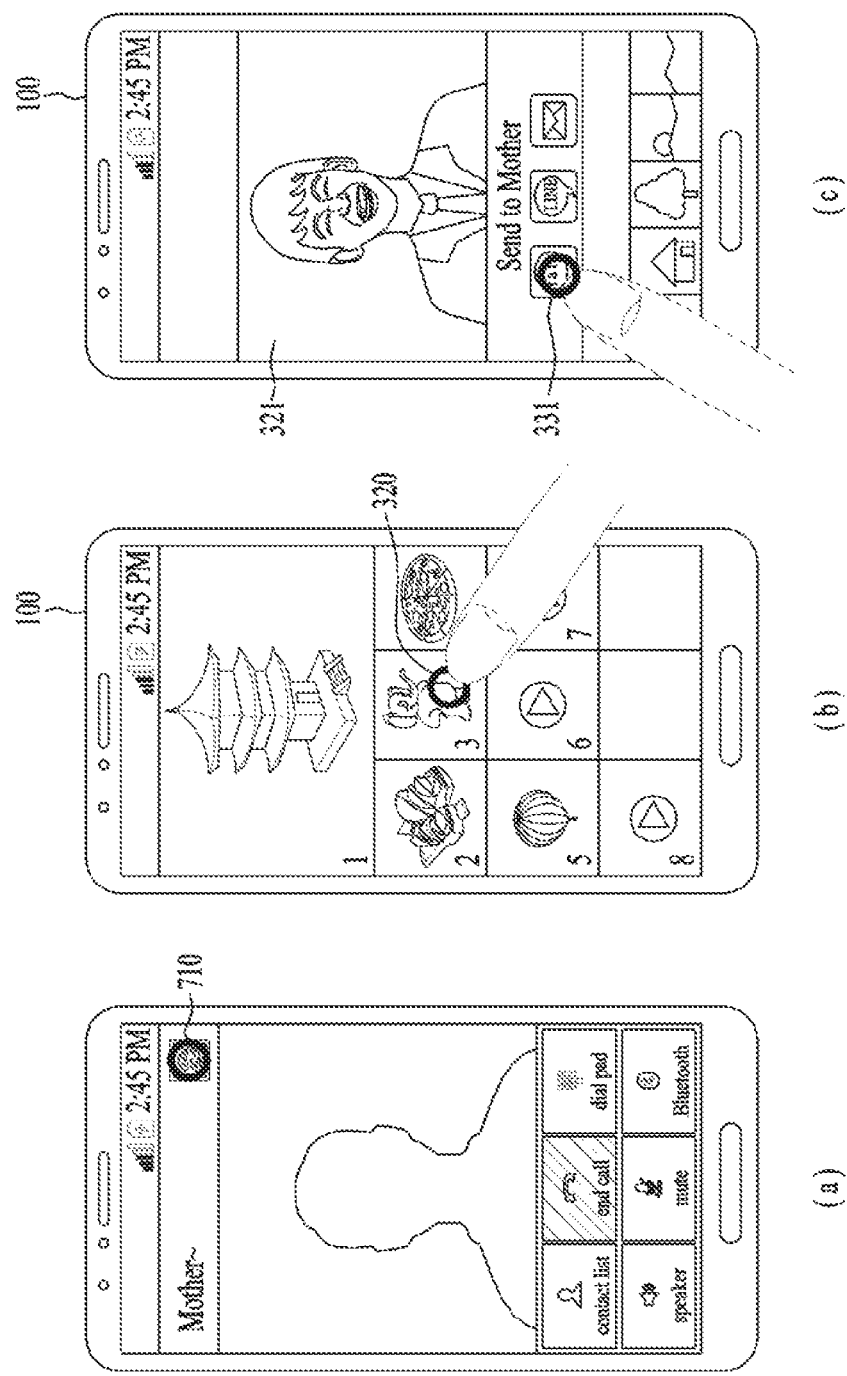
FIG. 7 is a diagram illustrating a screen for providing a convenient function configured to transmit an image to a counterpart while a user is on the phone.

FIG. 7 is a diagram illustrating providing a convenient function configured to transmit an image to a counterpart while a user is on the phone. Referring to FIG. 7 (*a*), if a prescribed condition is satisfied while a user is on the phone, an icon 710 of a gallery application can be displayed on a touch screen. In order to determine whether or not the prescribed condition is satisfied, the controller 180 can use voice recognition via a microphone 122 or a proximity sensor 141.

Specifically, if a user says such a specific word as "wait a second", which is input through the microphone 122, while the user is on the phone and/or if the proximity sensor 141 detects that a mobile terminal is far from a face of the user, the controller 180 can control the icon 710 to be displayed on the touch screen. If the user touches the icon 710 while the user is on the phone, as shown in FIG. 7 (*b*), the gallery application is executed and displayed on the touch screen.

In this instance, if the user searches for a folder 320 and selects an image preferred to be transmitted from the folder, as shown in FIG. 7 (*c*), the selected image 321 is displayed in full-view. A transmission menu is displayed at the bottom of the image 321. Further, if the user selects an icon 331 corresponding to a transmission medium preferred by the user, the image can be directly transmitted to a telephone call counterpart via an application corresponding to the selected icon 331.

In FIG. 7, although it is explained as the icon 710 of the gallery application is displayed according to whether a condition is satisfied while the user is on the phone, this is just an example. It is apparent that the displayed icon changes according to configuration. Moreover, the icon 710 can be immediately disappeared after a phone call is ended or the icon can be displayed for prescribed time after a phone call is ended.

So far, it is assumed and explained as the transmission menu configured to transmit an image to a specified counterpart is automatically displayed in a full-view state or a folder view state after a user enters a gallery application. Yet, the transmission menu can be called according to a command input of the user. This will be explained with reference to FIG. 8 to FIG. 14 in the following.

Figure 8:
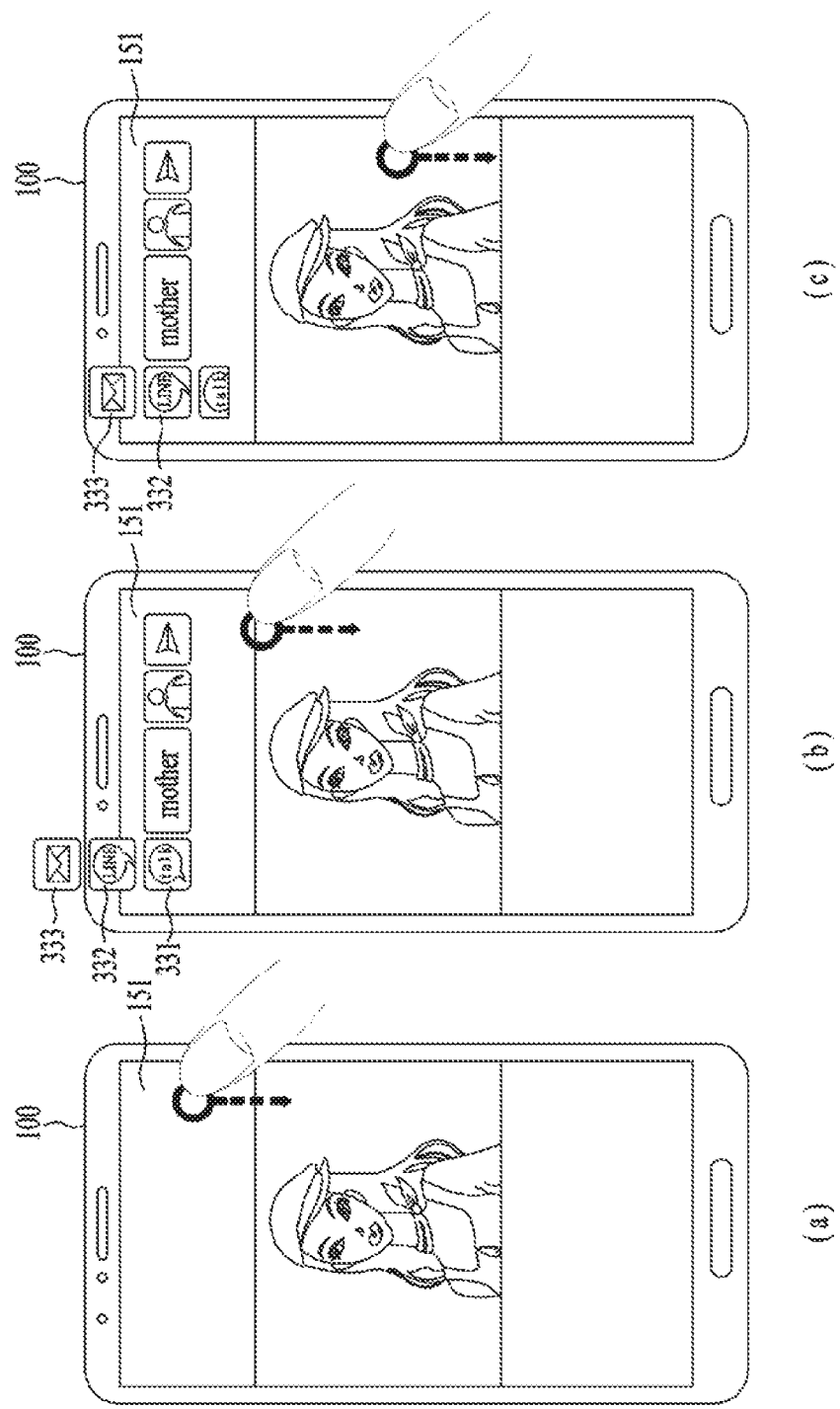
FIG. 8 is a diagram illustrating a process for calling up a transmission menu in a mobile terminal according to one embodiment of the present invention.

FIG. 8 is a diagram illustrating a process for calling up a transmission menu in a mobile terminal according to one embodiment of the present invention. Assume that a process of FIG. 8 corresponds to a process followed by a process of FIG. 3 (*b*).

Referring to FIG. 8 (*a*), a gallery application is executed within prescribed time after a phone call is ended and an image preferred to be transmitted is displayed according to selection of a user. In this instance, if the user touches a touch screen and drags the touch in down direction, as shown in FIG. 8 (*b*), a transmission menu, which is configured to transmit a currently displayed image to a last telephone call counterpart, can be displayed.

Further, a plurality of applications can be prepared to transmit the image. In a situation of FIG. 8 (*a*), if a touch-drag command is firstly input, an icon 331 of an application of the highest priority can be displayed only. In a situation of FIG. 8 (*b*), when the user intends to change an application to be used for transmitting the image, if a touch-drag command in down direction is input again, as shown in FIG. 8 (*c*), an icon 332 of an application of the second highest priority can be displayed. In a situation of FIG. 8 (*c*), if a touch-drag input is input once again, an icon 333 of an application of the third highest priority can be displayed.

The number of icons of the prepared applications, priority configuration and direction of a touch-drag command are just examples. It is apparent that the number of icons of the prepared applications, the priority configuration and the direction of the touch-drag command can be differently changed. Yet, it is preferable to configure the direction of the touch-drag command by direction different from direction (in general, horizontal direction) of a touch-drag command for searching for an image in a full-view state. Priority of an application can be directly configured by a user, may follow an order of a frequently used application, can be determined according to a characteristic (e.g., capacity, image size, etc.) of an image preferred to be transmitted and can be changed according to a specified counterpart.

FIG. 9 is a diagram illustrating a process for calling up a transmission menu and changing a recipient in a mobile terminal according to one embodiment of the present invention. Referring to FIG. 9 (*a*), a state of calling up a transmission menu is shown. In this instance, a recipient field 910 indicating a counterpart to which an image is to be transmitted is set to a mother corresponding to a counterpart of a last telephone call.

In addition, if a user intends to change a counterpart to receive an image preferred by the user, the user can select a phonebook menu 920 from the transmission menu. By doing so, as shown in FIG. 9 (*b*), candidate recipients stored in the phonebook can be displayed in a form of a dropdown menu 930. In this instance, if the user selects a recipient preferred by the user from the dropdown menu, as shown in FIG. 9 (*c*), the recipient field 910 can be changed by the selected recipient preferred by the user.

On the contrary, if the user touches the recipient field 910, as shown in FIG. 9 (*d*), a virtual keypad 940 is displayed and the user can directly edit the recipient field 910. If selection of an application to be used for transmitting an image is completed by the process mentioned earlier in FIG. 8 and selection of a recipient is completed by the process mentioned earlier in FIG. 9 (*a*) to (*d*), as shown in FIG. 9 (*e*), the user can transmit a currently displayed image to a specified recipient by selecting a transmission confirm button 950 of the transmission menu.

FIG. 10 is a diagram illustrating a different example of a process for calling up a transmission menu in a mobile terminal according to one embodiment of the present invention. Referring to FIG. 10 (*a*), a user can display a plurality of images in a thumbnail-view form by executing a gallery application within prescribed time after a telephone call is ended.

In this instance, if the user inputs a touch-drag command in horizontal direction, as shown in FIG. 10 (*b*), a visual effect 1010 of a prescribed form can be displayed at one side of a screen. As shown in FIG. 10 (*c*), the user can select a plurality of images preferred to be transmitted in the thumbnail view while the visual effect 1010 is maintained. If the selection is completed, as shown in FIG. 10 (*d*), the user can call up a transmission menu 1020, which is configured to transmit the selected images to a last telephone call counterpart, by inputting a touch-drag command again in horizontal direction.

An icon 1021 corresponding to an application to be used for transmitting the images, a recipient field 1023 configured by the last telephone call counterpart, a phonebook call menu 1025 for changing a counterpart displayed on the recipient field 1023, a transmission confirmation button 1027, and the like can be displayed on the transmission menu 1020. As mentioned in the foregoing description, the icon 1021 corresponding to the application to be used for transmitting the images can be switched according to a predetermined order whenever a touch-drag command is input.

Of course, the user can edit the recipient field 1023 by selecting the field. If selection of an application to be used for transmitting the images and selection of a recipient are completed, as shown in FIG. 10 (*e*), the user selects the transmission confirmation button 1027 from the transmission menu and as shown in FIG. 10 (*c*), the user can transmit a plurality of the selected images at a time. In FIG. 10, if a touch-drag command is input in direction opposite to direction of a touch-drag command input for calling up a visual effect, the transmission menu 1020 or the visual effect 1010 can be disappeared from the screen depending on a step.

Figure 11:
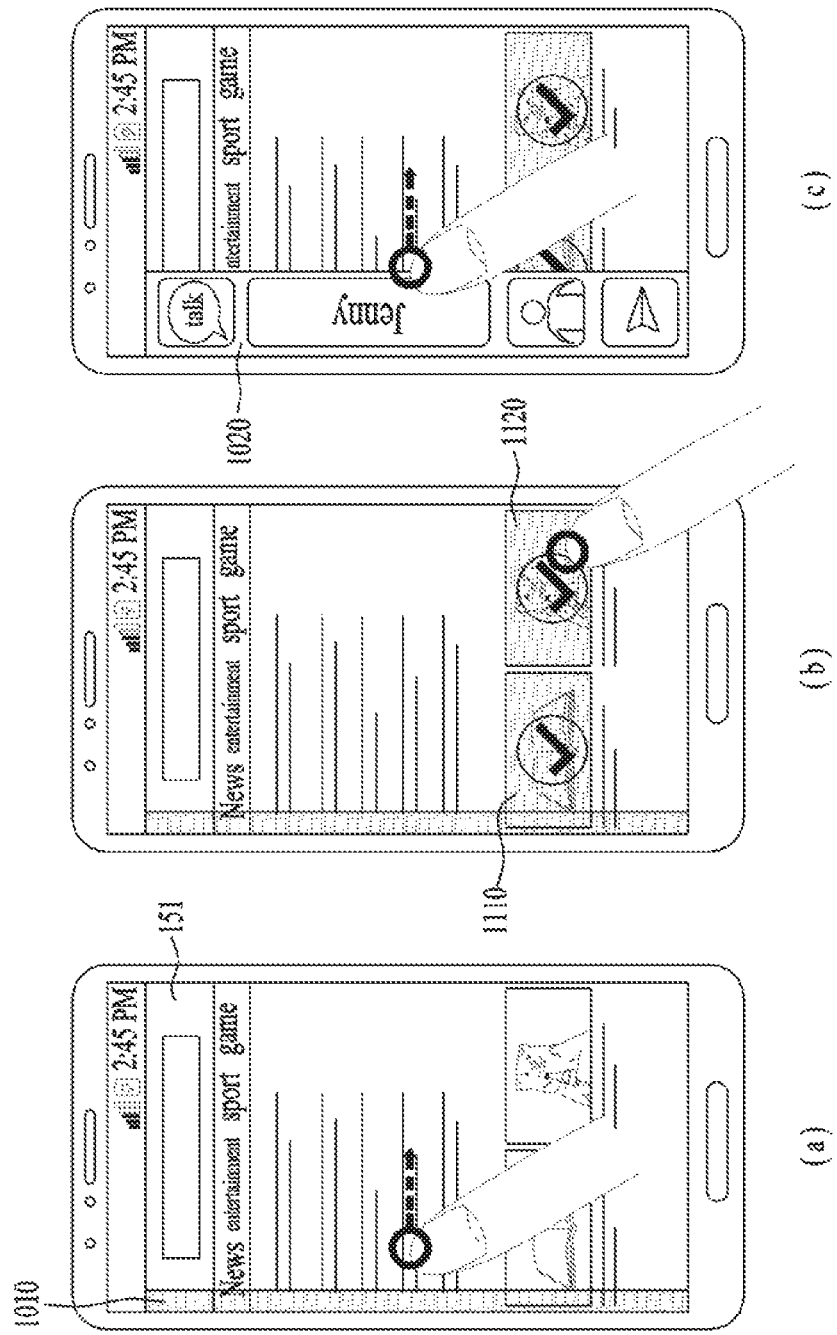
FIG. 11 is a diagram illustrating a process for calling up a transmission menu in the middle of using a web browser application in a mobile terminal according to one embodiment of the present invention.

FIG. 11 is a diagram illustrating a process for calling up a transmission menu in the middle of using a web browser application in a mobile terminal according to one embodiment of the present invention. Referring to FIG. 11 (*a*), if a web browser application is executed within prescribed time after a user finishes a telephone call, a web page is displayed on a touch screen 151 through the web browser application.

In this instance, if the user inputs a touch-drag command in predetermined direction, a visual effect 1010 of a prescribed form can be displayed at one edge of the touch screen. As shown in FIG. 11 (*b*), the user can select at least one or more contents 1110/1120 preferred to be transmitted from the web page. When selection of the contents is completed, if the user inputs a touch-drag command again, as shown in FIG. 11 (*c*), a transmission menu is called and the user can conveniently transmit the contents preferred to be transmitted, which are selected from the web page, to a predetermined specific counterpart.

Figure 12:
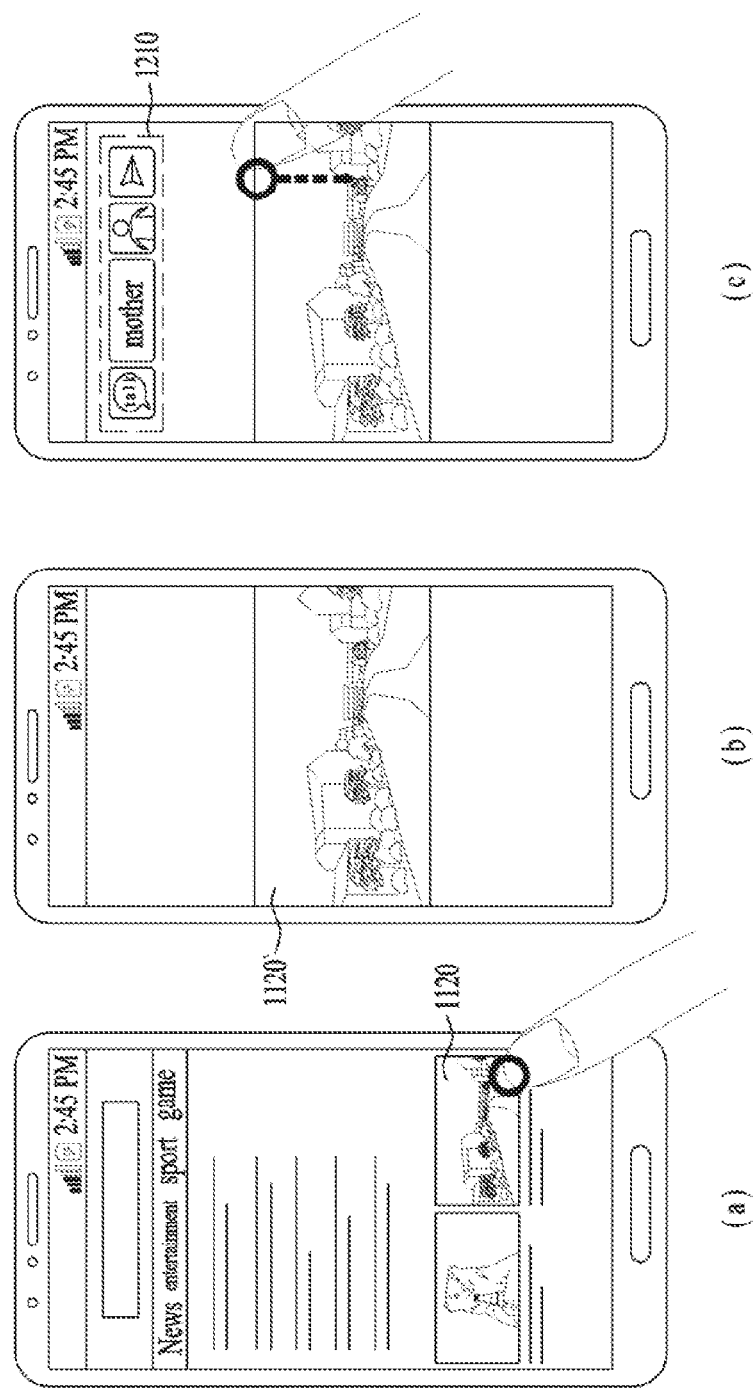
FIG. 12 is a diagram illustrating a process for calling up a transmission menu in the middle of using a web browser application in a mobile terminal according to another embodiment of the present invention.

FIG. 12 is a diagram illustrating a different example of a process for calling up a transmission menu in the middle of using a web browser application in a mobile terminal according to one embodiment of the present invention. Referring to FIG. 12 (*a*), if a web browser application is executed within prescribed time after a user finishes a telephone call, a web page is displayed on a touch screen 151 through the web browser application.

In this instance, if the user selects an image 1120 from images displayed on the web page, as shown in FIG. 12 (*b*), the image 1120' can be displayed in a full-view form. In this situation, as shown in FIG. 12 (*c*), if the user inputs a touch-drag command in down direction, similar to FIG. 8, a transmission menu 1210 can be displayed. Since the transmission menu 1210 is similar to what is mentioned earlier with reference to FIGS. 8 and 9, for clarity of the specification, explanation on the overlapped part is omitted at this time.

Figure 13:
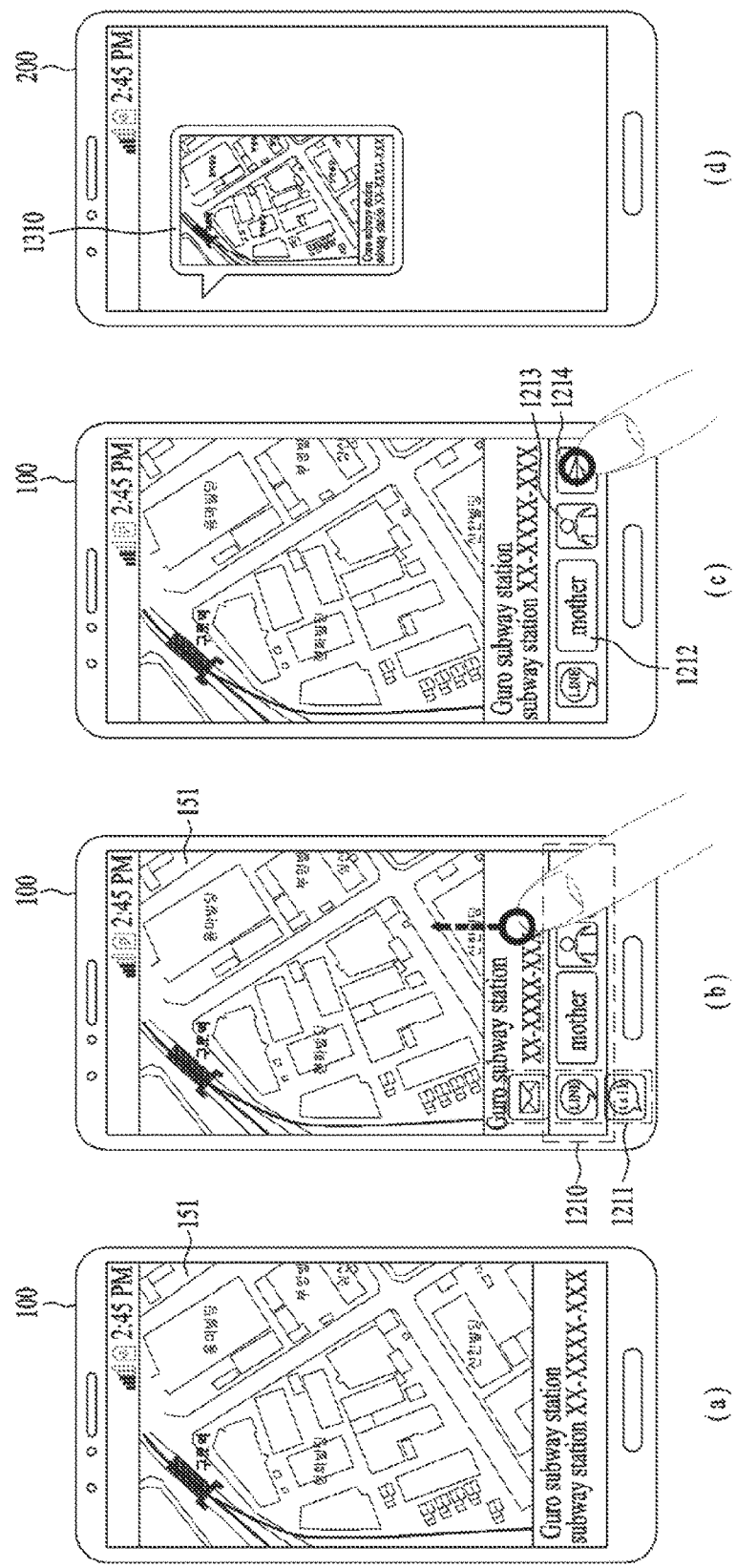
FIG. 13 is a diagram illustrating a process for calling up a transmission menu in the middle of using a map application in a mobile terminal according to one embodiment of the present invention.

FIG. 13 is a diagram illustrating a process for calling up a transmission menu in the middle of using a map application in a mobile terminal according to one embodiment of the present invention. Referring to FIG. 13 (*a*), if a user executes a map application within prescribed time after a telephone call is ended, a map is displayed on a touch screen 151.

In this instance, as shown in FIG. 13 (*b*), the user can input a touch-drag input in up direction to a point except a region at which the map is scrolled. By doing so, a transmission menu 1210 is called and displayed at the bottom of the touch screen. Further, an icon 1211 corresponding to an application for transmitting a map image to a counterpart may change according to the count of inputting a touch-drag command. And, as shown in FIG. 13 (*c*), if a transmission confirmation button 1214 is selected, a currently displayed map can be transmitted to a counterpart corresponding to a recipient field 1212 through a selected application.

Thus, as shown in FIG. 13 (*d*), a map image 1310 currently displayed on a mobile terminal of the user can be received and displayed on a mobile terminal 200 of the counterpart. Of course, the user can change a recipient through the recipient field 1212 or a phonebook menu 1213. As mentioned in the foregoing description, a counterpart of a last telephone call is displayed on the recipient field 121 as a default.

Figure 14:
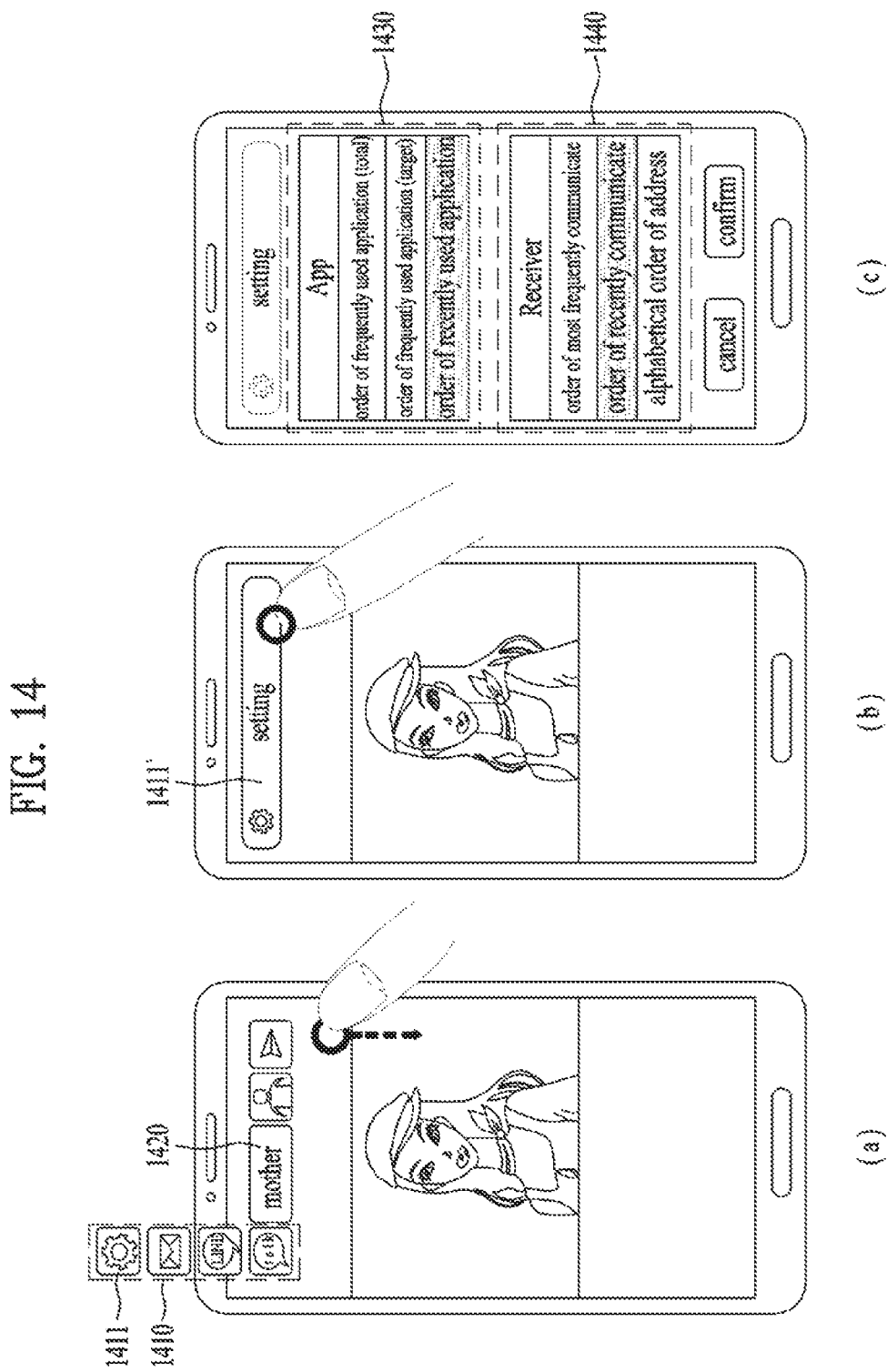
FIG. 14 is a diagram illustrating a process for changing configuration of a transmission menu in a mobile terminal according to one embodiment of the present invention.

FIG. 14 is a diagram illustrating a process for changing configuration of a transmission menu in a mobile terminal according to one embodiment of the present invention. Referring to FIG. 14 (*a*), a transmission menu is called through a touch-drag command input. When there are three candidate applications to be used for transmitting an image, if a touch-drag command is input three times more after the transmission menu is firstly called, a setting icon 1411 can be displayed in an icon field 1410.

If the setting icon 1411 is displayed, as shown in FIG. 14 (*b*), the transmission menu can be changed into a setting menu 1411'. When the setting icon 1411 or the setting menu 1411' is displayed, if a user touches the setting icon 1411 or the setting menu 1411', as shown in FIG. 14 (*c*), a menu 1430 for configuring an order of displaying icons of candidate applications to be used for transmission, a menu 1440 for configuring an order of displaying candidate recipients in a dropdown menu when a phonebook menu is selected, etc. can be displayed.

Meanwhile, in case of an automatically displayed transmission menu, which is displayed without a call of a user, a recipient can be changed. This will be explained with reference to FIG. 15 in the following. In particular, FIG. 15 is a diagram illustrating a process for changing a recipient of a transmission menu in a mobile terminal according to one embodiment of the present invention.

Figure 15:
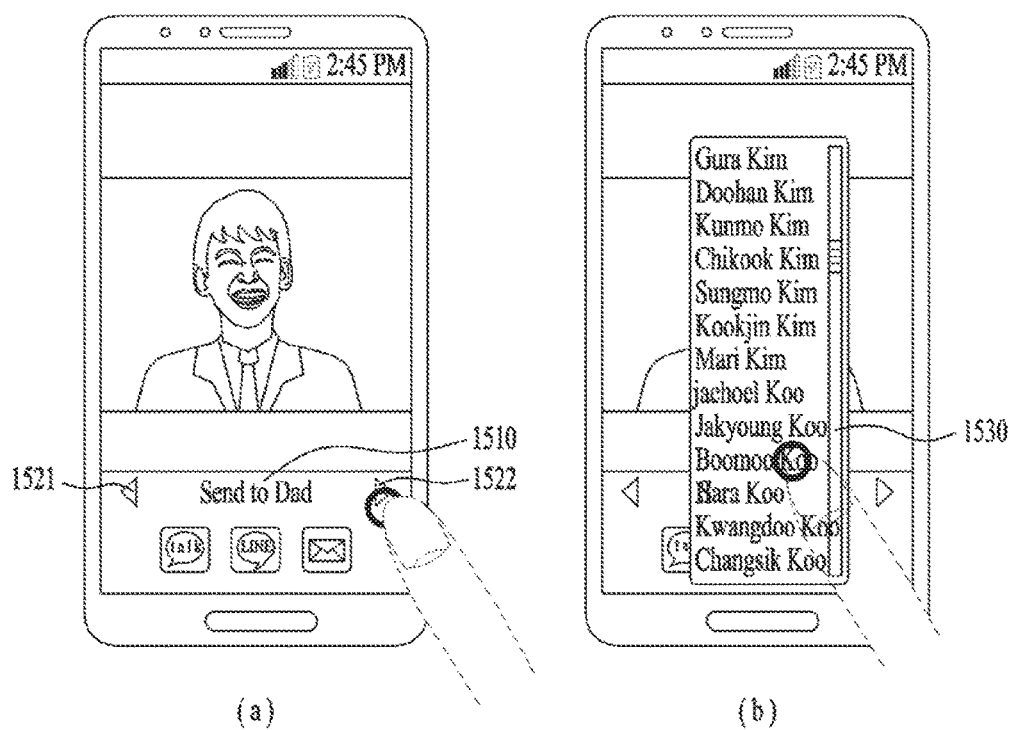
FIG. 15 is a diagram illustrating a process for changing a recipient of a transmission menu in a mobile terminal according to one embodiment of the present invention.

Referring to FIG. 15 (*a*), when a transmission menu is displayed, arrow icons 1521/1522 can be respectively displayed at both sides of a recipient filed 1510, which is specified by a previously executed function before a gallery application. A user can change a counterpart displayed in the recipient field by selecting the arrow icons. If the recipient field is selected instead of the arrow icons, as shown in FIG. 15 (*b*), a dropdown menu 1520 is displayed and a new recipient can be selected from the dropdown menu.

The aforementioned transmission menu can be applied to various applications including a video playback application, a file browser application, a camera application and the like. This will be explained with reference to FIGS. 16 and 17 in the following.

Figure 16:
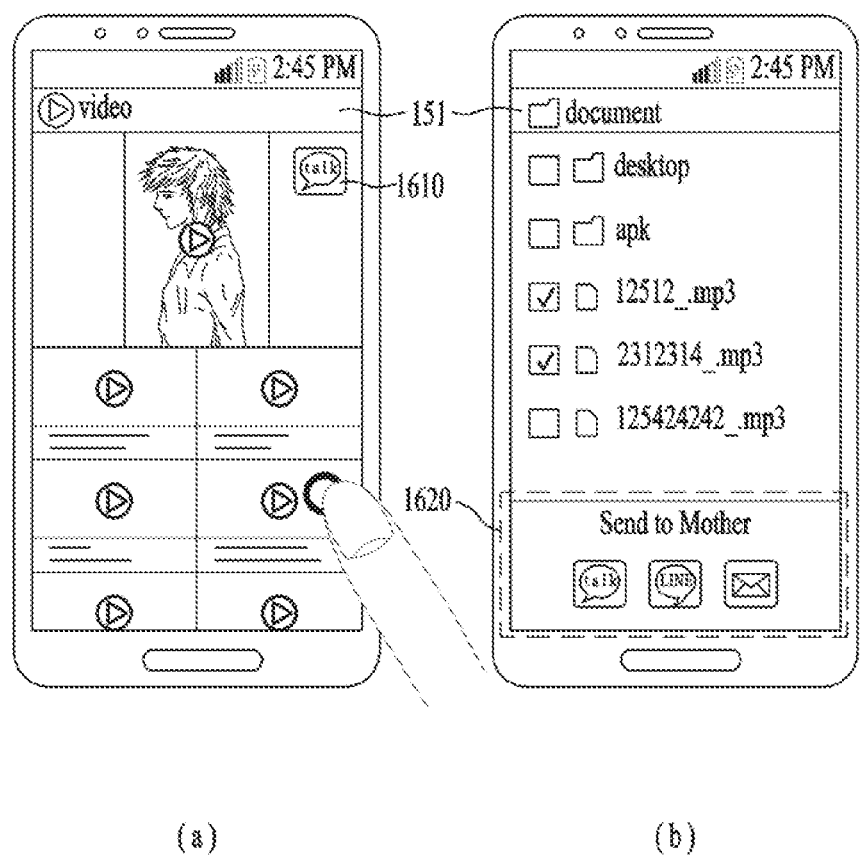
FIG. 16 is a diagram illustrating a process for calling up a transmission menu via various applications in a mobile terminal according to one embodiment of the present invention.

In particular, FIG. 16 is a diagram illustrating a process for calling up a transmission menu via various applications in a mobile terminal according to one embodiment of the present invention. Referring to FIG. 16 (*a*), a video playback application is executed and thumbnails of videos capable of being played in a thumbnail view mode are displayed.

In this instance, if execution of the video playback application satisfies a condition of the step S230 of FIG. 2, an icon 1610 corresponding to an application for transmitting a video to a counterpart specified by a previously executed function can be displayed. A user can transmit a video preferred to be transmitted to the specified counterpart by dragging and dropping a thumbnail of a video on the icon 1610. As shown in FIG. 16 (*b*), if a file browser application is executed to satisfy the condition of the step S230 of FIG. 2 and one or more files are selected, a transmission mode 1620 can be automatically displayed.

FIG. 17 is a diagram illustrating a different example of a process for calling up a transmission menu via various applications in a mobile terminal according to one embodiment of the present invention. If a gallery application is executed within prescribed time immediately after a picture or a video is captured, it strongly indicates that a picture is to be shared with a person who has just communicated with a user.

For instance, as shown in FIG. 17 (*a*), if the user captures a picture of a counterpart 1710 and immediately checks the captured picture by executing the gallery application, the controller 180 performs face recognition on the captured picture and can then make a transmission menu 1720, which is capable of transmitting the picture to a person in the picture 1710', to be displayed as shown in FIG. 17 (b).

As shown in FIG. 17 (c), when a meeting of a plurality of members is being held, if an image 1730 is captured via a camera 121 of a mobile terminal 100 and the image is checked within prescribed time after the image is captured, as shown in FIG. 17 (d), it can display a transmission menu 1740 configured to immediately transmit the image 1730' to a group of members participating in the meeting. In this instance, the group can be specified with reference to meeting-related information set to a schedule management application. Alternatively, the group may correspond to a group corresponding to a plurality of terminals currently connected through short-range communication.

A situation shown in FIG. 17 (c) to (d) can also be performed when a picture captured by the controller 180 is recognized as notes written on a white board. Whether or not it is the notes written on the white board can be determined by recognizing an OCR text and detecting a figure, line and background color and the like from the picture captured by the controller 180. If it is determined as the notes written on the white board, it is considered as a user intends to share the picture with the members participating in the meeting. If the picture is displayed in a full-view form via the gallery application, the controller 180 can make a transmission menu 1740, which is configured to immediately transmit the picture to a smart device of a participant of the meeting, to be displayed.

In the following, determination on whether or not a reading condition mentioned earlier in the step S260A is satisfied and change of the second menu mentioned earlier in the step S270 are explained in more detail with reference to FIG. 18 and FIG. 19. In particular, FIG. 18 is a diagram illustrating changing a second menu of a second function in a mobile terminal according to one embodiment of the present invention. In FIG. 18, assume that the second function corresponds to a gallery application and the second menu corresponds to a thumbnail list displayed at the bottom of an image in a full-view form.

In addition, assume a situation that a condition corresponding to the step S230 is not satisfied. For example, the situation may include a prescribed time elapses after at least a first function is executed in a mobile terminal, a counterpart is not specified by the first function within prescribed time after the first function is executed, no function is executed after booting of the mobile terminal is performed, etc. Moreover, assume that the controller 180 performs face recognition on the image displayed in the full-view form and manages a history for the face recognition. Further, assume that a reading condition is satisfied when an image including an identical person is checked more than three times.

Referring to FIG. 18 (a), a gallery application is executed and an image 1811 is displayed in a full-view form. In this instance, thumbnails 1820 of images positioned at before and after the image can be displayed at the bottom of the image 1811 in a folder in which the image is included. It is not mandatory that the thumbnails 1820 require images included in a same folder. The thumbnails can be arranged according to a capturing order, an image generation order or the like.

In this instance, as shown in FIG. 18 (b), a user operates a back key button 123a to search for a different image and can then enter a folder view form. The user searches for folders and, as shown in FIG. 18 (c), can make an image 1812 including a person identical to a person included in the image 1811 displayed in the full-view form to be displayed.

Subsequently, as shown in FIG. 18 (d), if an image 1813 including a person identical to the person included in the aforementioned two images is displayed in full-view form, the controller 180 can determine it as a reading condition is satisfied. Hence, the controller 180 searches for images including the person in stored images and can change the thumbnails 1820' displayed at the bottom of the image with searched images (i.e., images including the same person). By doing so, the user can conveniently search for the images including the person.

FIG. 18 has been explained under an assumption that an image includes a single person. If a plurality of persons are included in a single image, whether or not a reading condition is satisfied can be determined based on whether or not a specific person included in the image is magnified. This will be explained with reference to FIG. 19 in the following.

Figure 19:
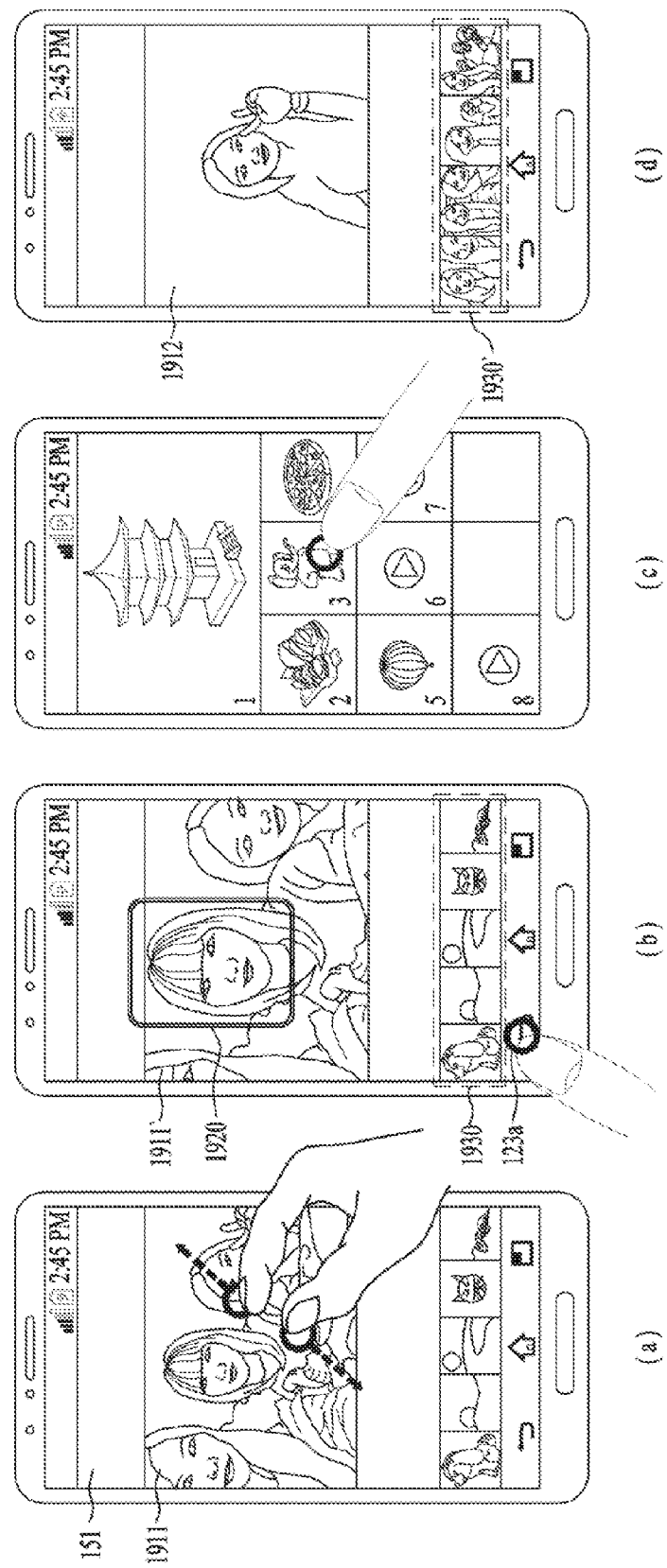
FIG. 19 is a diagram illustrating changing a second menu of a second function in a mobile terminal according to another embodiment of the present invention.

FIG. 19 is a diagram illustrating a different example of a form changing a second menu of a second function in a mobile terminal according to one embodiment of the present invention. Referring to FIG. 19 (a), an image 1911 including a plurality of persons is displayed in a full-view form. In this instance, as shown in FIG. 19 (b), a user can magnify the image 1911' based on a specific person 1920 by inputting a touch command for zoom-in.

When the image is firstly magnified, thumbnails 1930 positioned at the bottom of the image can be arranged according to a predetermined condition without any change. Subsequently, if the user selects a back button 123a, releases the full-view state, and as shown in FIG. 19 (c), magnifies images including the person 1920 by entering a full-view mode more than a predetermined count by passing through such a state as a folder view, a thumbnail view or the like, thumbnails 1930' of the images including the person can be displayed at the bottom of an image 1912, which is displayed in the full-view state after a condition is satisfied. In this instance, the thumbnails 1930' can be displayed by being magnified based on a face of the person.

In the following, determination on whether the function switching condition mentioned earlier in the step S260B is satisfied and a form of displaying the third menu mentioned earlier in the step S280 are explained in more detail with reference to FIG. 20 to FIG. 22. In the following, unless there is special mention, for clarity, it is assumed that a second function corresponds to a smart banking application and a third function corresponds to an image on which a security code is displayed. In addition, assume a situation that conditions corresponding to the step S230 and the step S260A are not satisfied when the smart banking application is executed.

Figure 20:
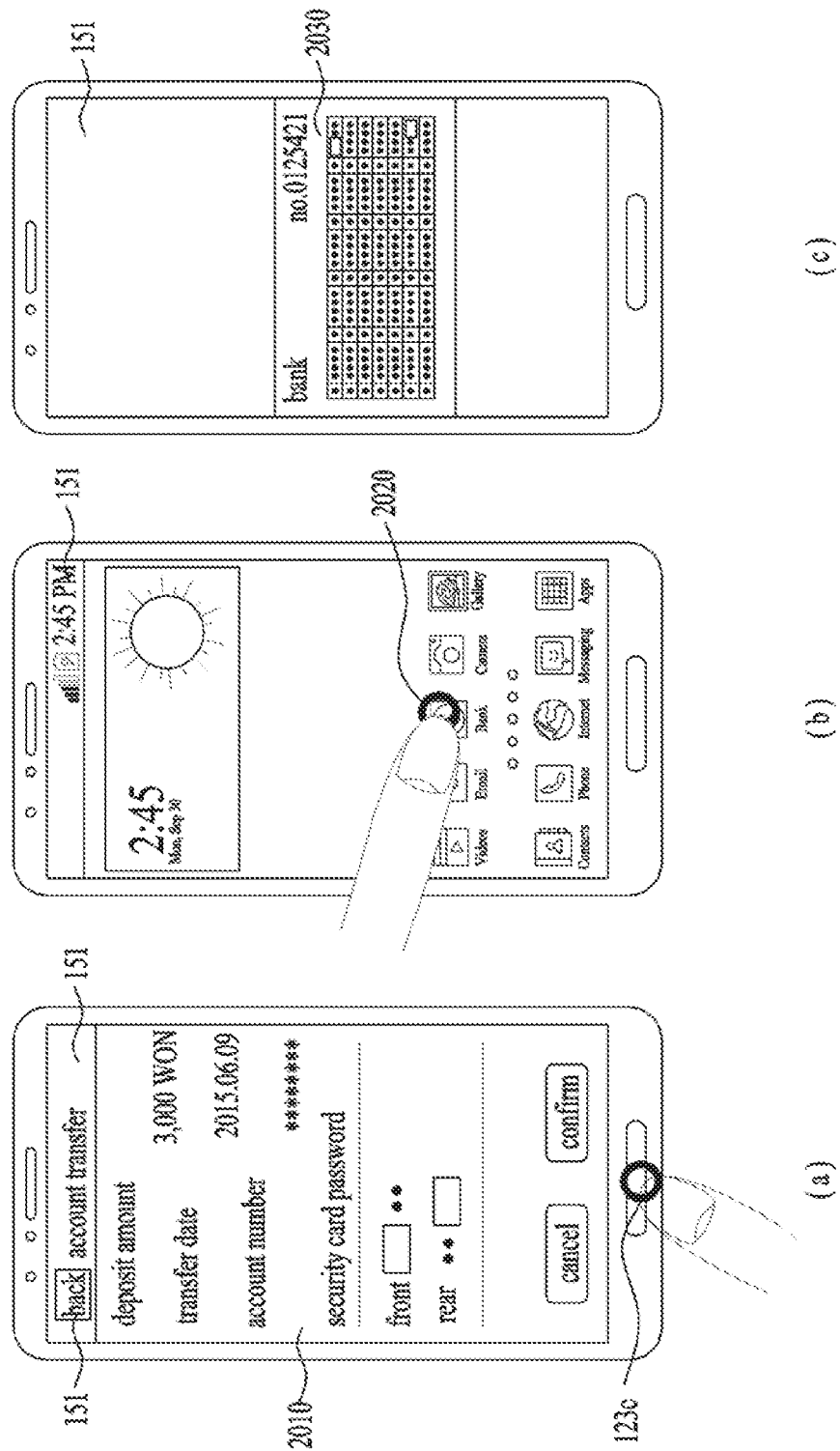
FIG. 20 is a diagram illustrating a process for performing a function switch in a general mobile terminal.

FIG. 20 is a diagram illustrating a process for performing a function switch in a general mobile terminal. Referring to FIG. 20 (a), a user executes a smart banking application in a mobile terminal and an account transfer page 2010 is displayed on a touch screen 151. When the user inputs a transfer password to perform an account transfer, if the user does not remember the transfer password, the user may read an image on which the password is recorded.

As shown in FIG. 20 (b), the user can enter a home screen by operating a home key button 123c. In this instance, the user executes a gallery application by selecting a gallery application icon 2020 from the home screen and can read a security card image 2030 on which the password is recorded. Further, in order for the user to check the password and input the password, the user should switch an application to make the account transfer page to be displayed again.

In order to solve the aforementioned inconvenience, if switching between two functions occurs more than prescribed times, the controller 180 determines it as a function switching condition is satisfied (S260B) and can provide the user with a switching menu for convenient switching between the two functions. Or, the controller can make the two function to be displayed at the same time via division of a screen. This will be explained with reference to FIG. 21 to FIG. 23 in the following.

Figure 21:
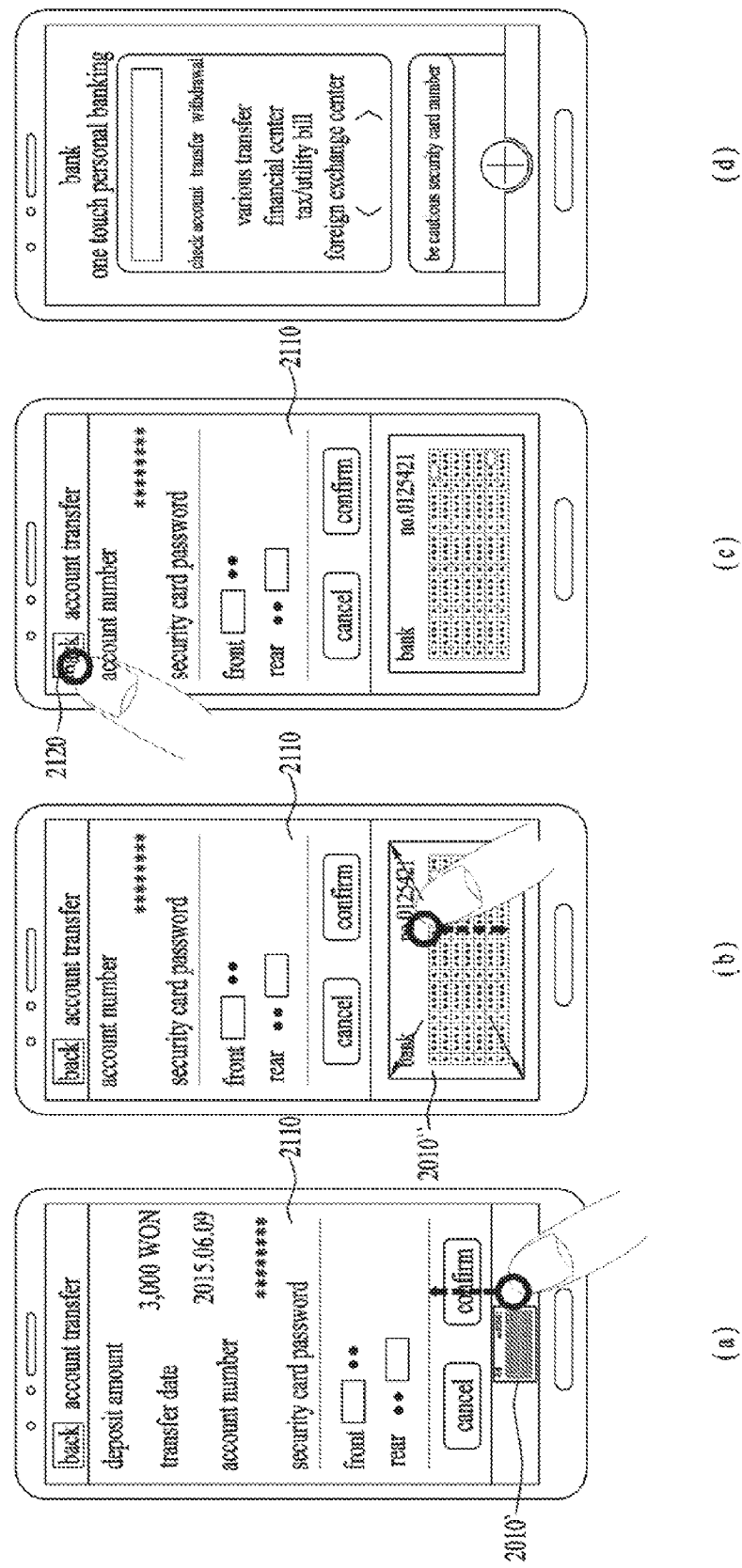
FIG. 21 is a diagram illustrating providing a convenient function via division of a screen when a function switching condition is satisfied in a mobile terminal according to one embodiment of the present invention.

FIG. 21 is a diagram illustrating providing a convenient function via division of a screen when a function switching condition is satisfied in a mobile terminal according to one embodiment of the present invention. In FIG. 21, assume that a function switching condition has been already satisfied in a manner that switching from an account transfer page of a smart banking application to a security card image occurs more than a predetermined times.

Referring to FIG. 21 (*a*), when a user enters an account transfer page in a smart banking application, a screen is divided and a security card image 2030' can be displayed at the lower part of the touch screen. In this instance, the security card image 2030' may correspond to a thumbnail of an actual security card image 2030 or a thumbnail displayed through a gallery application by executing the gallery application in accordance with a size of the lower part of the touch screen.

In this instance, if the user drags a region on which the security card image is displayed in up direction, as shown in FIG. 21 (*b*), a size of the region increases and the security card image 2030" can also be magnified. Of course, if the user drags the region in down direction, the region may return to a state shown in FIG. 21 (*a*). Meanwhile, as shown in FIG. 21 (*c*), if a back menu 2120 is selected in the account transfer page, as shown in FIG. 21 (*d*), division of the screen is terminated as the user is leaving from the account transfer page. And, the security card image may not be displayed anymore.

Figure 22:
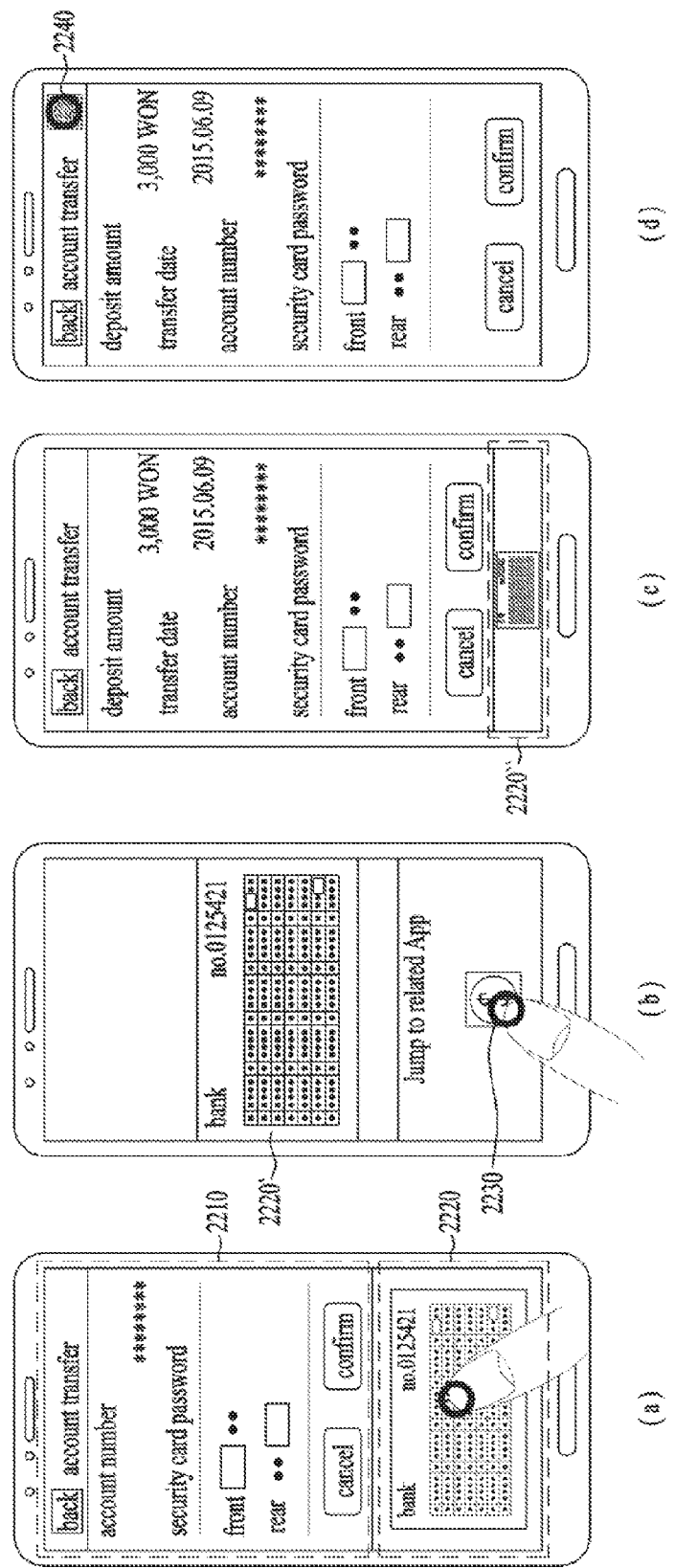
FIG. 22 is a diagram illustrating providing a convenient function via a shortcut menu when a function switching condition is satisfied in a mobile terminal according to one embodiment of the present invention.

FIG. 22 is a diagram illustrating a form providing a convenient function via a shortcut menu when a function switching condition is satisfied in a mobile terminal according to one embodiment of the present invention. Referring to FIG. 22 (*a*), when a user enters an account transfer page, a screen is divided into a lower part and an upper part.

In addition, the account transfer page 2210 is displayed on the upper part of the screen and a security card image 2220 is displayed on the lower part of the screen. In this instance, if the user touches the security card image, as shown in FIG. 22 (*b*), a gallery application is switched to a whole screen and the security card image can be displayed in a full view form 2220'. A shortcut menu 2230 for switching to a previously executed menu, i.e., the account transfer page of the smart banking application, can be provided to the bottom of the security card image.

If the user selects the shortcut menu 2230, as shown in FIG. 22 (*c*), the user can return to the account transfer page which is displayed in a state of dividing the screen. Yet, since the user has closely checked the security card image via the procedure mentioned earlier in FIG. 22 (*b*), the security card image 2220' can be displayed by being more reduced compared to the legacy security card image 2220. As shown in FIG. 22 (*d*), a shortcut menu 2240 for a corresponding image can be displayed instead of division of a screen in the account transfer page. If the shortcut menu 2240 is selected, it can switch to a state such as a state of FIG. 22 (*b*).

So far, although switching between a banking application and a gallery application is mainly explained, this is just an example. The present embodiment may be non-limited by the example. The present embodiment can be applied to various applications. switching between different applications is shown in FIG. 23.

Figure 23:
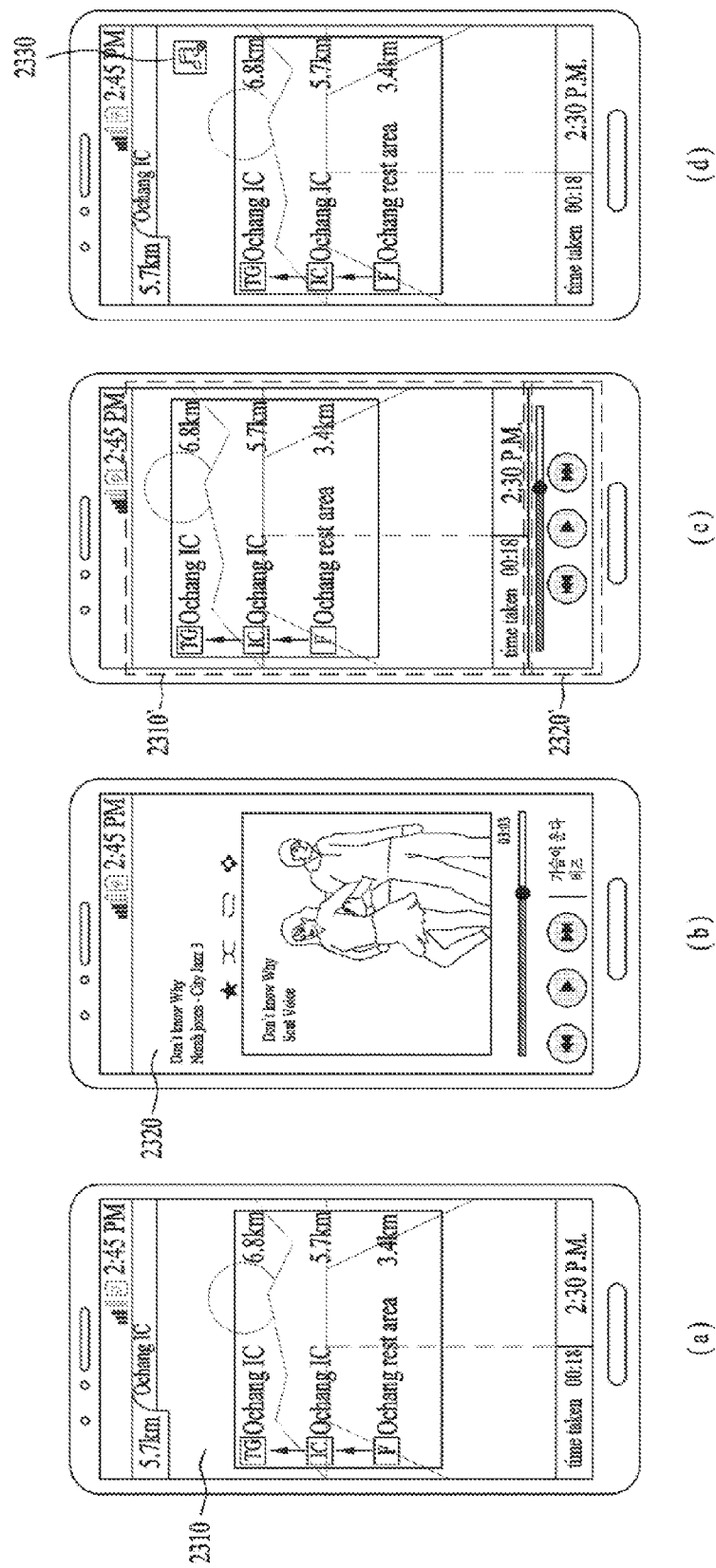
FIG. 23 is a diagram illustrating providing a convenient function when a function switching condition is satisfied in a mobile terminal according to another embodiment of the present invention.

FIG. 23 is a diagram illustrating a different example of a form providing a convenient function when a function switching condition is satisfied in a mobile terminal according to one embodiment of the present invention. Referring to FIG. 23 (*a*), a navigation application is executed in a mobile terminal and direction information 2310 is displayed.

In this instance, as shown in FIG. 23 (*b*), if a user performs switching to a music playback application 2320 as many as predetermined times, as shown in FIG. 23 (*c*), a screen is divided into an upper part and a lower part. The direction information 2310' is displayed at the upper part of the screen and a control medium 2320' capable of changing a playback state of the music playback application can be displayed at the lower part of the screen. In the meantime, as shown in FIG. 23 (*d*), when the navigation application executed, a shortcut menu 2330 for switching to the music playback application can be provided to a region of the screen.

The above-described methods can be implemented in a program recorded medium as computer-readable codes. The computer-readable media may include all kinds of recording devices in which data readable by a computer are stored. The computer-readable media may include a HDD (hard disk drive), an SSD (solid state disk), an SDD (silicon disk drive), a ROM, a RAM, a CD-ROM, magnetic tapes, floppy discs, optical data storage devices, and the like for example and also include carrier-wave type implementations (e.g., transmission via Internet). And, the computer can include a controller 180 of a terminal. It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

Accordingly, embodiments of the present invention provide several advantages. For example, a mobile terminal enhancing user convenience is provided. In addition, when executing a specific function, a content transmission medium to which a counterpart is automatically specified in consideration of a previously executed different function is provided.

Further, a mobile terminal is provided with a convenient function such as rearranging contents according to a previous use pattern of a corresponding function and a shortcut to a different function and the like.

In addition, the above-described methods can be implemented in a program recorded medium as processor-readable codes. The processor-readable media may include all kinds of recording devices in which data readable by a processor are stored. The processor-readable media may include ROM, RAM, CD-ROM, magnetic tapes, floppy discs, optical data storage devices, and the like for example and also include carrier-wave type implementations (e.g., transmission via Internet).

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
    a wireless communication processor;
    a touch screen; and
    a controller configured to:
    execute a telephone call application to conduct a phone call to or from a counterpart,
    during the phone call, input a voice command or a movement of the mobile terminal away from a user to display a content viewing application icon,
    receive selection of the content viewing application icon to execute the content viewing application and display a plurality of contents,
    receive a selection of at least one or more contents of the plurality of contents in the content viewing application,
    display the selected at least one or more contents in a full-view state,
    automatically display a first menu for transmitting the selected at least one or more contents to the counterpart through the wireless communication processor, wherein the first menu comprises information of the counterpart and a plurality of icons, the plurality of icons indicating different transmission mediums for transmitting the selected at least one or more selected to the counterpart, and
    receive an input selecting one of the plurality of icons and transmit the selected at least one or more contents to the counterpart.

2. The mobile terminal of claim 1, wherein the content viewing application comprises a gallery application and the selected at least one or more contents comprise an image.

3. The mobile terminal of claim 2, wherein the display of the selected at least one or more contents in the full-view state comprises displaying the image in a full-view state.

4. The mobile terminal of claim 1, wherein the controller is further configured to, upon selection of a phonebook menu, display a plurality of contacts to change the counterpart.

5. The mobile terminal of claim 4, wherein in response to a selection of one of the plurality of contacts, the controller is further configured to change the counterpart to a second counterpart corresponding to the selected contact.

6. The mobile terminal of claim 1, wherein the movement of the mobile terminal is detected by a proximity sensor of the mobile terminal, and
    wherein voice input is detected by a microphone of the mobile terminal.

7. The mobile terminal of claim 1, wherein the first menu is displayed at a bottom of the selected one or more contents.

8. A method of controlling a mobile terminal, the method comprising:
    executing, via a controller of the mobile terminal, a telephone call application to conduct a phone call to or from a counterpart;
    inputting, during the phone call, a voice command or a movement of the mobile terminal away from a user to display a content viewing application icon;
    receiving a selection of the content viewing application icon to execute the content viewing application and display a plurality of contents;
    receiving a selection of at least one or more contents of the plurality of contents in the content viewing application;
    displaying the selected at least one or more contents in a full-view state;
    automatically displaying a first menu for transmitting the selected at least one or more contents to the counterpart through a wireless communication processor of the mobile terminal, wherein the first menu comprises information of the counterpart and a plurality of icons, the plurality of icons indicating different transmission mediums for transmitting the at least one or more selected contents to the counterpart; and
    receiving an input selecting one of the plurality of icons and transmitting the at least one or more selected contents to the counterpart.

9. The method of claim 8, wherein the content viewing application comprises a gallery application and the selected at least one or more contents comprise an image.

10. The method of claim 9, wherein displaying the selected at least one or more contents on the mobile terminal in the full-view state comprises displaying the image in a full-view state.

11. The method of claim 8, wherein the movement of the mobile terminal is detected by a proximity sensor of the mobile terminal, and
    wherein voice command is detected by a microphone of the mobile terminal.

12. The method of claim 8, further comprising changing the counterpart to a second counterpart for transmitting the selected at least one or more contents to, in response to an execution of a phonebook menu and a selection of contact corresponding to the second counterpart.

* * * * *